US011734209B2

(12) United States Patent
Kumar et al.

(10) Patent No.: US 11,734,209 B2
(45) Date of Patent: *Aug. 22, 2023

(54) SCALABLE INTERRUPT VIRTUALIZATION FOR INPUT/OUTPUT DEVICES

(71) Applicant: Intel Corporation, Santa Clara, CA (US)

(72) Inventors: Sanjay Kumar, Hillsboro, OR (US); Rajesh M. Sankaran, Portland, OR (US); Philip R. Lantz, Cornelius, OR (US); Utkarsh Y. Kakaiya, Folsom, CA (US); Kun Tian, Shanghai (CN)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/550,977

(22) Filed: Dec. 14, 2021

(65) Prior Publication Data

US 2022/0107910 A1 Apr. 7, 2022

Related U.S. Application Data

(63) Continuation of application No. 16/493,148, filed as application No. PCT/CN2017/078943 on Mar. 31, 2017, now Pat. No. 11,200,183.

(51) Int. Cl.
*G06F 13/28* (2006.01)
*G06F 13/24* (2006.01)
(Continued)

(52) U.S. Cl.
CPC .......... *G06F 13/24* (2013.01); *G06F 9/45558* (2013.01); *G06F 9/4812* (2013.01); *G06F 2009/45579* (2013.01)

(58) Field of Classification Search
CPC .... G06F 13/24; G06F 9/4812; G06F 9/45558; G06F 12/1081
(Continued)

(56) References Cited

U.S. PATENT DOCUMENTS 8,055,827 B2 11/2011 Serebrin et al.
2006/0069899 A1* 3/2006 Schoinas ............. G06F 12/1036
711/212

(Continued)

OTHER PUBLICATIONS

International Preliminary Report on Patentability, PCT App. No. PCT/CN2017/078943, dated Oct. 10, 2019, 5 pages.
(Continued)

*Primary Examiner* — Titus Wong
(74) *Attorney, Agent, or Firm* — Nicholson De Vos Webster & Elliott LLP

(57) ABSTRACT

Implementations of the disclosure provide processing device comprising: an interrupt managing circuit to receive an interrupt message directed to an application container from an assignable interface (AI) of an input/output (I/O) device. The interrupt message comprises an address space identifier (ASID), an interrupt handle and a flag to distinguish the interrupt message from a direct memory access (DMA) message. Responsive to receiving the interrupt message, a data structure associated with the interrupt managing circuit is identified. An interrupt entry from the data structure is selected based on the interrupt handle. It is determined that the ASID associated with the interrupt message matches an ASID in the interrupt entry. Thereupon, an interrupt in the interrupt entry is forwarded to the application container.

20 Claims, 14 Drawing Sheets

(51) Int. Cl.
*G06F 9/455* (2018.01)
*G06F 9/48* (2006.01)

(58) Field of Classification Search
USPC ......................................................... 710/268
See application file for complete search history.

(56) References Cited

U.S. PATENT DOCUMENTS

| | | | | |
|---|---|---|---|---|
| 2006/0075147 A1* | 4/2006 | Schoinas | ............. | G06F 12/1027 710/22 |
| 2007/0168643 A1* | 7/2007 | Hummel | ............. | G06F 12/1081 711/E12.067 |
| 2007/0168644 A1* | 7/2007 | Hummel | ............. | G06F 12/1081 711/E12.067 |
| 2010/0100648 A1* | 4/2010 | Madukkarumukumana | ................ | G06F 12/1081 710/22 |
| 2010/0191888 A1* | 7/2010 | Serebrin | ............... | G06F 9/4812 718/1 |
| 2011/0023027 A1* | 1/2011 | Kegel | ................. | G06F 12/1009 718/1 |
| 2011/0197003 A1 | 8/2011 | Serebrin et al. | | |
| 2013/0138840 A1* | 5/2013 | Kegel | ................... | G06F 12/109 710/22 |
| 2013/0232288 A1* | 9/2013 | Madukkarumukumana | ................ | G06F 13/24 710/269 |
| 2014/0250250 A1* | 9/2014 | Saripalli | ............... | G06F 9/4812 710/266 |
| 2016/0179721 A1 | 6/2016 | Neiger et al. | | |
| 2017/0199827 A1 | 7/2017 | Sankaran et al. | | |
| 2019/0347125 A1 | 11/2019 | Sankaran et al. | | |

OTHER PUBLICATIONS

International Search Report and Written Opinion, PCT App. No. PCT/CN2017/078943, dated Jan. 4, 2018, 6 pages.
Non-Final Rejection dated Jan. 28, 2021 for U.S. Appl. No. 16/493,148.
Notice of Allowance, U.S. Appl. No. 16/493,148, dated Aug. 20, 2021, 8 pages.

* cited by examiner

SCALABLE INTERRUPT VIRTUALIZATION FOR INPUT/OUTPUT DEVICES

CROSS-REFERENCE TO RELATED APPLICATIONS

The present application is a continuation application of U.S. patent application Ser. No. 16/493,148 filed Sep. 11, 2019, now U.S. Pat. No. 11,200,183, which is a national stage application of International Application No. PCT/CN2017/078943 filed Mar. 31, 2017, each of which is incorporated by reference herein.

TECHNICAL FIELD

Embodiments of the disclosure relate generally to microprocessors and more specifically, but without limitation, for scalable interrupt virtualization for input/output devices.

BACKGROUND

Virtualization allows multiple instances of an operating system (OS) to run on a single system platform. Virtualization is implemented by using software, such as a virtual machine monitor (VMM) or hypervisor, to present to each OS a "guest" or virtual machine (VM). The VM is a portion of software that, when executed on appropriate hardware, creates an environment allowing for the abstraction of an actual physical computer system also referred to as a "host" or "host machine." On the host machine, the virtual machine monitor provides a variety of functions for the VMs, such as allocating and executing request by the virtual machines for the various resources of the host machine.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
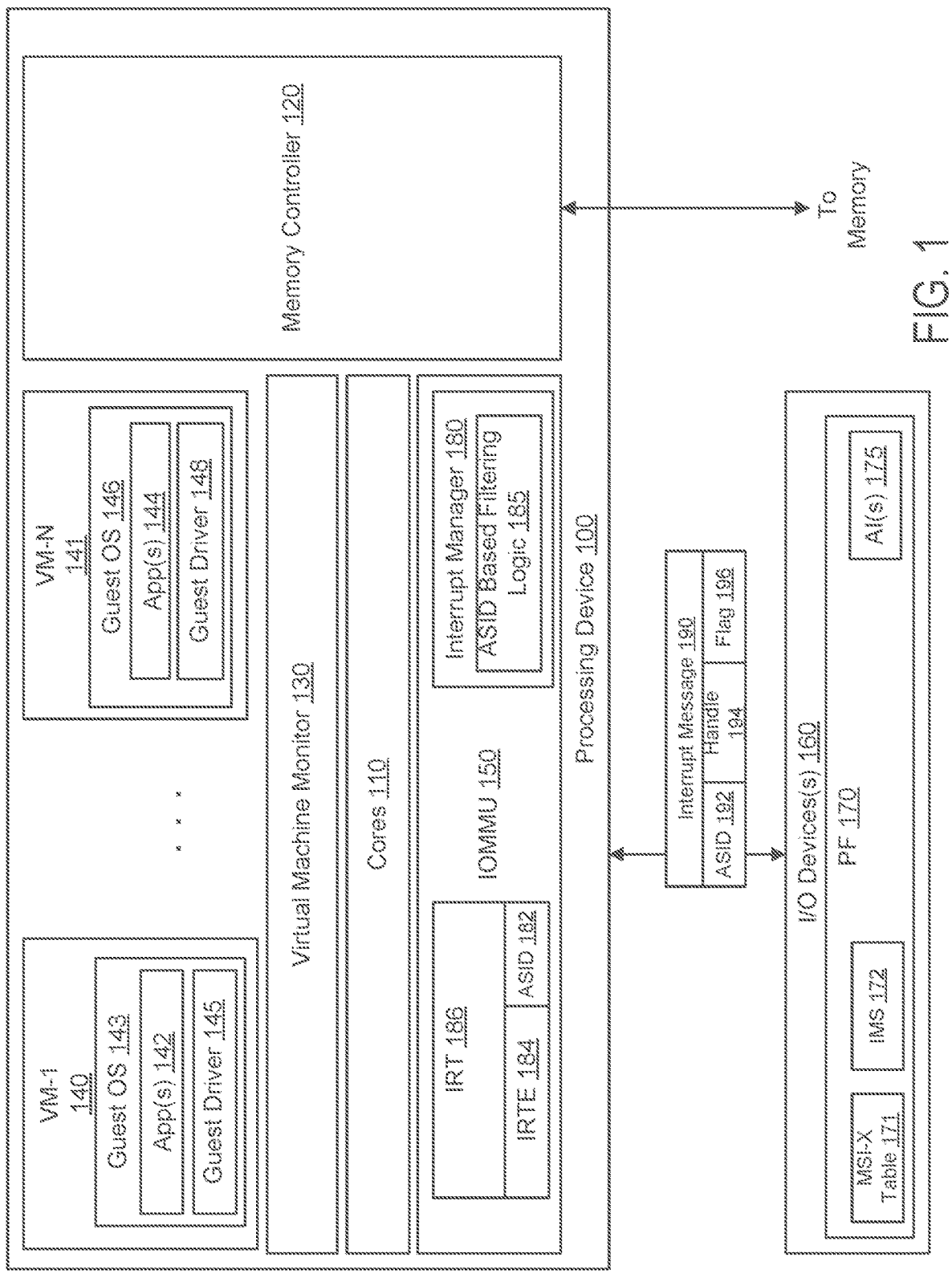
FIG. 1 illustrates a block diagram of a processing device for scalable interrupt virtualization for input/output devices according to one embodiment.

Many systems provide for the virtualization of resources. These resources may include input/output (I/O) devices that include controllers (such as bus, interconnect, and/or fabric controllers, network interface controllers (NICs), etc.), processors/accelerators (such as graphics processors, cryptographic and/or compression accelerators, etc.), and any other resources that may be addressed in the system. Various approaches to and usages of virtualization have been and continue to be developed, including those that are used with many (hundreds to thousands or more) of guests/virtual machines (VMs) or types of application containers. For convenience, the use of the term "container" may include any process running in an OS-managed and isolated execution environment.

In some situations, the system may implement scalable virtualization of I/O devices (Scalable IOV) where any number of I/O devices may be used and/or shared at various times by any number of VMs or application containers. In Scalable IOV, the I/O device implements a hosting function, such as a physical function (PF) of the I/O device, and several "assignable interfaces" (AIs) for each hosting function. These AIs can be directly assigned to VMs. Each AI is memory mapped to one or more pages (e.g., 4 KB) of memory mapped I/O (MMIO) registers that are used by the VM to directly read or write data from or to the I/O device without any virtual machine monitor (VMM) involvement.

In some embodiment, each AI is an interface that may support one or more work submissions from the VM. These AIs enable a guest driver of the VM to submit work directly to the AI without host software (e.g., VMM) intervention. A guest driver may further allocate AIs for its VM's user-mode applications, in which case the user mode applications may also directly submit work to their respective AIs. Each AI corresponds to respective backend resources or PF of the I/O device. Further, all accesses to the AIs from the VMs are divided into, for example, control path accesses that are infrequent access and hence not performance critical, and fast path accesses that are frequent data path accesses and hence are performance critical. The AI's control path and fast path MMIO registers are laid out in different 4 KB pages so that the fast path registers can be mapped into the VM for direct access while control path registers are emulated in system software, such as the VMM, which manages the VMs. In this regard, VMs directly submit work to AIs using fast path registers, and the device processes the work from various VMs in an isolated manner.

The AIs are each assigned (e.g., by the VMM) an address space identifier (ASID) also referred to as a process address space identifier (PASID) (e.g., 20-bit number) that is used to identify the VM (and client within the VM) to which the AI is assigned. In some embodiments, the I/O device tags all of an AI's upstream direct memory access (DMA) requests with the assigned ASID. For example, PCI-Express (PCIe) devices can use PCIe ASID TLP (Transaction Layer Packet) prefix to tag their upstream DMA requests with the assigned ASID. For I/O devices supporting certain capabilities (e.g., PCI-Express), the device may generate interrupts to be delivered to the VM to which AIs of the device are assigned. For example, the I/O devices may generate an interrupt message comprising the device's assigned ASID. This interrupt message may be sent by the device to the VM via an input/output (I/O) memory management unit (IOMMU) of the system.

In some embodiments, the interrupt messages sent by the I/O device (on behalf of the AI) contain an interrupt handle (e.g., an identifier comprising a number of bits). The IOMMU of the system uses that handle to identify an entry in an interrupt remapping table (IRT). The IRT stores data for remapping interrupts signaled by the I/O device. Each entry in the IRT is referred to as an interrupt remapping table entry (IRTE). In that regard, the IOMMU uses the handle as an index to remap interrupt message from the I/O device into a specific IRTE that comprises an interrupt for the VMs.

For storing the interrupt messages comprising the interrupt handle, the AIs of the I/O device may utilize various mechanisms. For example, the AIs may use the PF of the I/O device to provide storage for their interrupt messages. In this example, the PF may support a table structure also referred to as a message-signaled interrupts (MSI)-X table structure. Each entry in the MSI-X table may be used by a specific command interface that the device supports. The command interface may program any MSI-X table entry of the PF with data of a type (e.g., cause) of interrupt associated with the interrupt message to be generated by the I/O device. The I/O device may then send the interrupt messages (on behalf of the AI) based on a MSI-X table entry corresponding to the type of interrupt requested by the device. The MSI-X table, however, may contain a limited number of entries (e.g., a maximum of 2048), which may not be enough for I/O devices supporting a large number of VMs. Moreover, in some I/O devices, a host PCI bus driver is responsible for programming the MSI-X table. In Scalable IOV, the VMM may also allocate MSI-X entries and program interrupt messages to the entries without going through the host PCI bus driver. Because of this, two entities (e.g., the host PCI bus driver and the VMM) may be modifying the same MSI-X table, which may lead to race conditions or other performance issues.

In another example, a non-architectural (device specific) interrupt message storage (IMS) may be used to store the interrupt message associated with an interrupt for each AI. For example, the I/O device may use an IMS to store an address/data value pair of an interrupt for each command interface of the AI. In certain I/O devices, the configuration of the interrupt for each AI in the IMS may be directly part of the configuration for that command interface. For example, the configuration of the command interface may be part of the supervisor device context information that is loaded by the device at start-up.

In other situations, some I/O devices may support a large number of AIs. For example, devices which support shared virtual memory (SVM) may implement a large number of AIs to support a large number of user space clients in various VMs. Devices that support a shared command interface as a shared work queue (SWQ) that allows the AIs to share the command interface for the I/O device with a number of VMs. All of the VMs (and user space clients within the VMs) may submit commands directly to the I/O device using the same SWQ. This allows the device to support a large number of AIs using the same SWQ. If the device also supports user level interrupts (e.g., an interrupt directed to a user space client of a VM), each of these AIs may need their own IMS entries for sending interrupts directly to the user space clients. Thus, implementing the IMS on the device for so many AIs may be very costly even if each AI used only one interrupt.

Embodiments of the disclosure address the above-mentioned and other deficiencies by providing scalable interrupt virtualization for I/O devices. The techniques disclosed herein may use both a MSI-X table and/or a non-architectural IMS for storing device interrupt message. In embodiments, an interrupt manager also referred to as an interrupt manager circuit (e.g., hardware component, circuitry, dedicated logic, programmable logic, microcode, etc.) that may be implemented in the IOMMU to provide ASID-based filtering in the IOMMU's IRTE. To provide ASID based filtering, IRTE format is extended to contain an ASID field along with the interrupt handle. In some embodiments, the system software, such as the VMM, can program an AI's ASID of an I/O device into a corresponding IRTE ASID field associated with a specific type of interrupt from the device. In one embodiment, the I/O device is then programmed to send an interrupt message in a data format that contains its AI's ASID along with the interrupt handle. In alternative embodiments, the I/O device tags the interrupt message data (which contains the interrupt handle) with the AI's ASID using the PCIe ASID TLP (similar to DMA requests). In this example, the I/O device sets a flag in the TLP header to distinguish interrupt messages from DMA requests. In either case, the interrupt manager of the IOMMU gets the ASID and the interrupt handle from the I/O device.

FIG. 1 illustrates a block diagram of a processing device 100 for a scalable interrupt virtualization for input/output devices according to one embodiment. The processing device 100 may be generally referred to as "processor" or "CPU". "Processor" or "CPU" herein shall refer to a device capable of executing instructions encoding logical or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. Memory controller 120 may perform functions that enable the processing device 100 to access and communicate with main memory (not shown) that includes a volatile memory and/or a non-volatile memory. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system. In one embodiment, the SoC may comprise processing device 100 and a memory. The memory for one such system is a DRAM memory. The DRAM memory can be located on the same chip as the processor and other system components. Additionally, other logic blocks such as a memory controller or graphics controller can also be located on the chip.

In an illustrative example, processing core 110 may have a micro-architecture including processor logic and circuits. Processor cores with different micro-architectures can share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

The processor core(s) 110 may execute instructions for the processing device 100. The instructions may include, but are not limited to, pre-fetch logic to fetch instructions, decode logic to decode the instructions, execution logic to execute instructions and the like. The processor cores 110 include a cache (not shown) to cache instructions and/or data. The cache includes, but is not limited to, a level one, level two, and a last level cache (LLC), or any other configuration of the cache memory within the processing device 100. The processor core 110 may be used with a computing system on a single integrated circuit (IC) chip of a computing system. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In one embodiment, the processing device 100 may include a virtual machine monitor (VMM) 130. VMM 130 may also be referred to as a hypervisor. The VMM 130 may abstract a physical layer of a hardware platform of a host computer system that may include processing device 100, and present this abstraction to a plurality guests (e.g., application containers) or virtual machines (VMs) 140, 141. The VMM 130 provides a virtual operating platform for the VMs 140, 141 and manages the execution of the VMs 140, 141. In some embodiments, more than one VMM may be provided to support the VMs 140, 141 of the processing device 100. Each VM 140, 141 may be a software embodiment of a machine that executes programs as though it was an actual physical machine. The programs may include a guest operating system (Guest OS), such as Guest OS 143 and Guest OS 146, and other types of software and/or applications (e.g., App 142, 144) running on the Guest OS.

In some embodiments, the processing device 100 may include an input/output memory management unit (IOMMU) 150. The IOMMU 150 can enable the I/O devices 160 to access memory associated with the VMs 140,141. The I/O devices 160 may be devices such as Ethernet hardware, accelerated graphics cards, and hard-drive controllers, which may be coupled to the processing device 100. To enable operations between virtual machines VMs 140, 141 and I/O devices 160, the IOMMU translates virtual addresses accessed by the I/O devices 160 into physical memory addresses corresponding to the VMs 140, 141. For example, the IOMMU 150, may be communicably coupled to the processing cores 110 and the memory (not shown) via the memory controller 120, and may map the virtual addresses of the VMs 140,141 to the corresponding physical memory addresses, allowing the I/O devices 160 to access the memory belonging to the VMs.

The VMM 130 may assign the I/O devices 160 to each of the VMs 140,141. Each of the I/O devices 160 coupled to the processing device 100, in implementations, may include one or more assignable interfaces (AIs) 175 for each hosting function (e.g., PF 170) supported by the device. Each of the AIs 175 supports one or more work submission interfaces. These interfaces enable a guest driver, such as guest drivers 145, 148, of the VMs 140, 141 to submit work directly to the AIs 175 of the I/O devices 160 without host software intervention by the VMM 130. The type of work submission to AIs is device-specific, but may include a dedicated work queue (DWQ) and/or shared work queue (SWQ) based work submissions.

The VMM 130 directly assigns the AIs 175 to the VMs 140,141. For example, each AI is memory mapped to one or more pages (e.g., 4 KB) of memory mapped I/O (MMIO) registers that are used by the VM to directly read or write data from or to the I/O devices 160 without involvement of the VMM 130. Each of the AIs 175 is assigned a process address space identifier (ASID) (e.g., 20-bit number), such as ASID 192, that is used to identify the VM to which the AI is assigned. For I/O devices 160 supporting certain capabilities (e.g., PCI-Express), the device may generate interrupts to be delivered to the VMs 140,141 to which AIs of the device are assigned. For example, the I/O devices 160 may generate an interrupt message 190 comprising the device's assigned ASID 192. The device may send this interrupt message 190 to the VMs 140,141 via the IOMMU 150.

For storing the interrupt messages 190 to be sent to the VMs 140, 141, the AIs 175 of the I/O device 160 may utilize various mechanisms. In some embodiments, the AIs 175 may use the PF 170 of the I/O device 160 to provide storage for their interrupt messages 190. In this example, the PF 170 may support a message-signaled interrupts (MSI)-X table structure 171. Each entry in the MSI-X table 171 may be used by a specific command interface that the device supports. The VMM may program any MSI-X table 171 entry of the PF 170 with data of a type (e.g., cause) of interrupt associated with the interrupt message 190 to be generated by the I/O device 160. The I/O device 160 may then send the interrupt messages 190 (on behalf of the AIs 175) to IOMMU 150 based on a MSI-X table 171 entry corresponding to the type of interrupt requested by the AI 175.

In other embodiments, the I/O devices 160 may implement non-architectural interrupt message storage (IMS) for storing the AI's 175 interrupt messages 190. The IMS 172 may be implemented on-device or off-device. For example, the VMM 130 can implement the IMS 172 for the I/O device 160 in host memory (not shown). In one embodiment, the IMS 172 includes interrupt information stored in a device specific table (not shown) in host memory. The I/O devices 160 may read this table associated with the IMS 172 to identify the interrupt information for each of the AIs 175. To optimize performance, the I/O device 160 can use an on-device cache for the IMS 172 to store interrupt information more frequently used by the AIs 175.

In some embodiments, the I/O device 160 may use a command payload to store the interrupt message 190 (to be used on the command completion). In this case, the command payload may be used directly by the I/O device 160 to generate an interrupt message 190. The command payload may contain the whole interrupt message 190 or it may contain only a subset of information (e.g., the payload may only contain handle and sub-handle value of the MSI-X message) in which case the I/O device 160 prepares the interrupt message 190 using a format template.

The ASID in the interrupt message 190 is trusted because it was set up by the VMM, while the interrupt handle is potentially untrusted. For example, the interrupt handle may be "trusted" if the interrupt handle is allocated by VMM 130 and setup into the I/O device 160 in a trusted manner. For example, if the I/O device 160 implements IMS for storing AI interrupt message, the I/O device 160 may also implement an interface (e.g., an MMIO register) to receive the trusted handle from the VMM 130. However, if the I/O device 160 uses command payload to store the interrupt message, the interrupt handle is "untrusted" since the I/O device 160 receives the interrupt handle directly from the VM. In one embodiment, the interrupt handle is allocated by VMM 130 and given to the VMs 140,141 using a VMM specific method to be used in the command payload. In that regard, the interrupt handle is unique across entire system. In another embodiment, the guest OS of VMs 141,141 allocates and manages the guest interrupt handle to be used in command payload and consequently, the handle is unique in the VMs 140,141. In yet another embodiment, the guest OS doesn't allocate and manage the handle space. Instead, the handle space is allocated and managed by each Scalable IOV guest driver associated with the VMs 140,141, making the untrusted handle guest driver specific. In all of these embodiments, the I/O device 160 sends an interrupt message to a VM on behalf of AI 175 using the interrupt handle. The interrupt manager of the IOMMU implements a ASID based interrupt remapping to convert the "untrusted" handle into a "trusted" interrupt before it is delivered to a VM.

In some embodiments, the processing device 100 implements an interrupt remapping to ensure those interrupt messages 190 for the I/O devices 160 are translated into trusted interrupts before they are delivered to the VMs 140,141. For example, the IOMMU 150 implements an interrupt manager 180, also referred to as an interrupt manager circuit, to extract the ASID 190 and handle 194 from the interrupt message 190. In implementations of the disclosure, the ASID 192 and handle 194 are used to identify a trusted interrupt to be delivered to the VM in accordance with the interrupt message 190. In some implementations, the I/O device 160 sets a flag 196 in the TLP header to a value that distinguishes the interrupt messages 190 from a DMA request. In that regard, the interrupt manager 180 may determine whether the flag 196 is set to values that indicate the interrupt message 190 is to be re-mapped to an interrupt for the VM 140. In some embodiments, the interrupt manager 180 may be implemented as part of the IOMMU 150. In alternative embodiments, the interrupt manager 180 may be implemented in a separate hardware component, circuitry, dedicated logic, programmable logic, microcode of the processing device 100 or any combination thereof. In one embodiment, the interrupt manager 180 may include a micro-architecture including processor logic and circuits similar to the processing cores 110. In some embodiments, the interrupt manager 180 may include a dedicated portion of the same processor logic and circuits used by the processing cores 110.

In some embodiments where the VMM 130 allocates and manages the interrupt handle, the IOMMU 150 implements "ASID based filtering" logic 185 via interrupt manager 180 to ensure only valid guest handles are used by the AIs 175 to interrupt the VMs 140,141. For example, the I/O device 160 sends the interrupt message 190 to the IOMMU on behalf of its AI 175. The interrupt message data comprises a ASID 192 of the AI 175 and an interrupt handle 194. Further, an IRT 186 of IOMMU 150 is extended so that each IRTE 184 includes a ASID field 182. The ASID in the IRTE 184 is setup by the VMM 130 to an AI's ASID when it allocates an interrupt handle for the VM and sets up the corresponding IRTE to interrupt the VM on behalf of AI 175. The VM sends the interrupt handle to the AI 175 using a command payload and the I/O device 160 sends the interrupt message 190 to the IOMMU to notify the VM about command completion. The interrupt manager 180 of the IOMMU extracts the interrupt handle 194 from the interrupt message data and uses it to index the IRT 186 to identify a pointer to an IRTE 184. In some embodiments, the interrupt manager 180 extracts a ASID 182 from an IRTE 184 of the IRT 186. If the ASID 192 in the interrupt message data matches the ASID 182 in the IRTE 184, the interrupt manager uses the IRTE 184 to identify an Interrupt Posting structure and send a Posted interrupt to the VM. If the ASID 192 in the interrupt message data does not match or is different from the ASID 182 in the IRTE 184, then the interrupt manager blocks the interrupt from being forwarded to the VM and records the error in an error status register. For example, the IOMMU 150 may ignore the interrupt message 190 by "dropping it" and reporting an error to host software VMM 130 through an error register. Thus, an additional advantage of using the "ASID based filtering" logic 185 is that it prevents one VM from sending spurious interrupts to other VMs For example, without "ASID based filtering" logic 185, if two AIs 175 of a I/O device 160 are assigned to two different VMs 140 and 141, the untrusted handle from one VM can index into the other VM's IRTE and there is no way for the IOMMU 150 to detect it. Essentially, the VM can send the wrong interrupt handle to its AI which in turn uses the handle to send the interrupt message to IOMMU 150 that can cause the IOMMU 150 to generate spurious interrupts to another VM.

Figure 2:
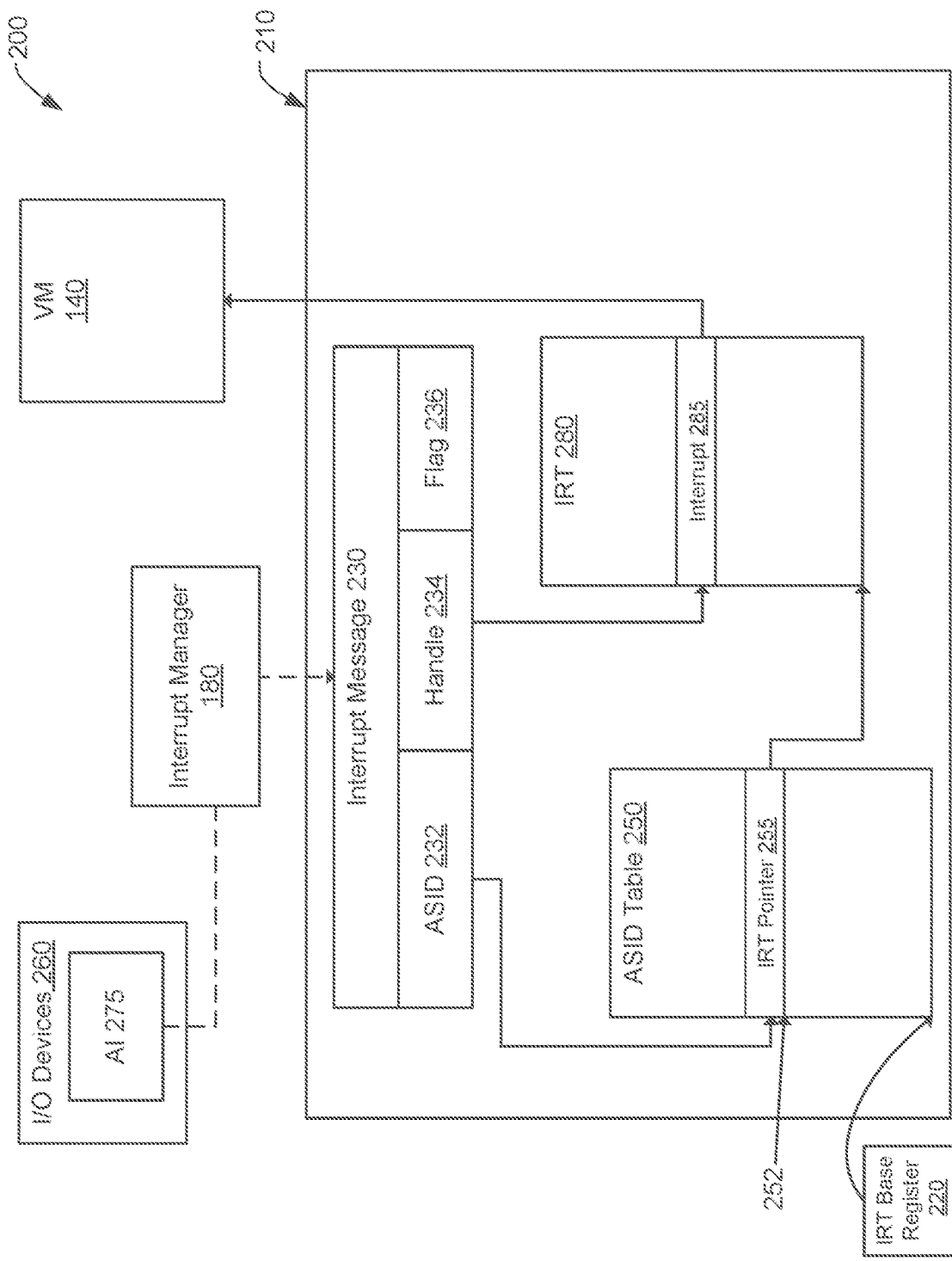
FIG. 2 illustrates a block diagram of a system including a memory storing an interrupt message for scalable interrupt virtualization for input/output devices according to one embodiment.

FIG. 2 illustrates a block diagram of a system 200 including a memory 210 storing for scalable interrupt virtualization for input/output devices 260 according to one embodiment. In this example, system 200 includes the interrupt manager 180 of the IOMMU 150 of processing device 100 of FIG. 1. In this example, the I/O device 260 (which may be the same as the I/O device 160 of FIG. 1) includes an AI 275 (which may be the same as the AIs 175 of FIG. 1) for a hosting function of the device 260. The AI 275 can be directly assigned to VM 140. For example, the AI 275 may be mapped to one or more pages (e.g., 4 KB) of memory mapped I/O (MMIO) registers. The MMIO registers are used by the VM 140 to directly read or write data from or to the I/O device 260 without any virtual machine monitor (VMM) involvement.

In some embodiments, the I/O device 260 may generate interrupts on behalf of the AI 275 to be delivered to the VM 140, for example, via IOMMU 150. In one embodiment, the I/O device 260 is programmed to send an interrupt message 230 in a data format that contains the AI's ASID 232 along with an interrupt handle 234. The interrupt message 230 may be a data structure (such as an array) that comprises bits identifying the ASID 232 and interrupt handle 234. For example, ASID 232 may be a 20-bit identifier and handle 234 may be a 16-bit identifier. In alternative embodiments, the I/O device 260 tags the interrupt message 230 (which contains the interrupt handle 234) with the AI's ASID 232 using the PCIe ASID TLP (similar to DMA requests). In that example, the I/O device 260 sets a flag 236 in the TLP header to a value that distinguishes the interrupt messages 230 from a DMA request. In that regard, the interrupt manager 180 may determine whether the flag 236 is set to values that indicate the interrupt message 230 is to be re-mapped to an interrupt for the VM 140.

In one embodiment, the guest OS of VM 140 allocates and manages the interrupt handle 234 and consequently, the handle is unique in the VM 140. The interrupt manager 180 may remap the "untrusted" handle 234 into a "trusted" interrupt 285 setup by the VMM. For example, the handle 234 may be "untrusted" because guest driver associated with the VM 140 manages allocation of handle 234. In some embodiments, IOMMU 150 may implement a table structure, such as ASID table 250, in memory 210 of the system. For the interrupt manager to locate the table 250, the IOMMU 150 may set an IRT Base register 220 with an address pointer pointing to the ASID table 250. Each entry 252 in the ASID table 250 points to a ASID-granular IRT 280. In this regard, the VMM 130 configures trusted interrupts, such as interrupt 285, into the ASID-granular IRT 280 for the ASID assigned to the VM 140. In other embodiments, instead of implementing a separate ASID table 250, the IOMMU 150 can re-use the ASID table of the DMA-Remapping table such that its ASID entries are extended to contain the ASID IRT pointer 255. In other embodiments, the length of the ASID 232 and handle 234 may be different and the IRT 280 can be a multi-level table as well.

In operation, the interrupt manager 180 may intercept the interrupt message 230 from the I/O device 260. Thereupon, the interrupt manager 180 may use the IRT Base register 220 to identify the ASID table 250. The interrupt manager 180 may use the ASID 232 to index the ASID table 250 to select or otherwise identify a specific entry 252. The entry 252 includes a ASID IRT pointer 255 to the ASID-granular IRT 280. Based on the interrupt handle 234, the interrupt manager 180 identifies a trusted interrupt 285 for the VM 140. For example, the interrupt manager 180 may use the interrupt handle 234 to index the IRT 280 to identify the interrupt 285. The "trusted" interrupt 285 set up by the VMM 130 is then provided to the VM 140 in accordance with the interrupt message 230. If the interrupt manager 180 determines that the interrupt handle 234 index is not set up in the IRT, the interrupt manager 180 blocks the interrupt 285 from being delivered to the VM 140.

Figure 3:
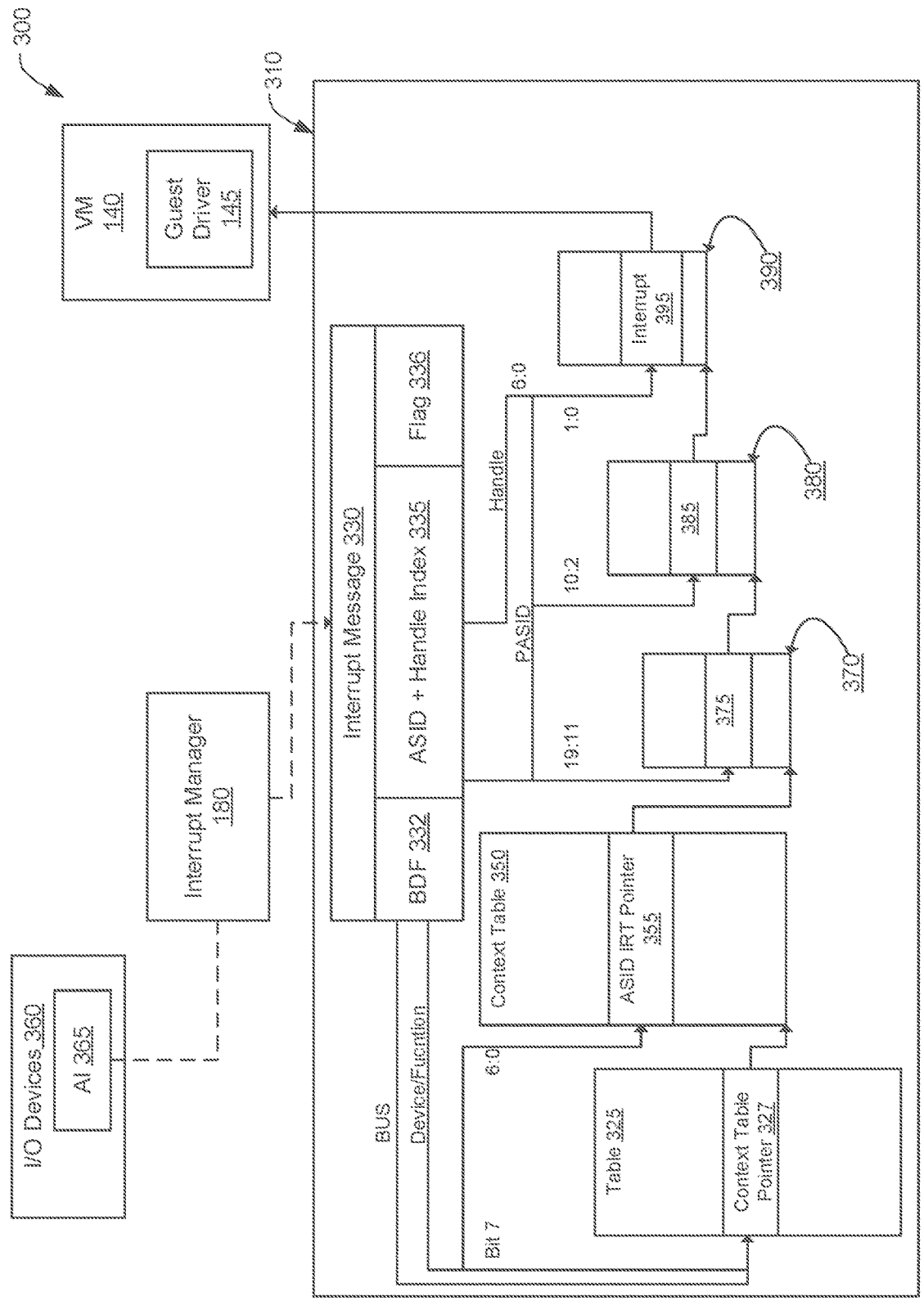
FIG. 3 illustrates a block diagram of another system including a memory storing an interrupt message for scalable interrupt virtualization for input/output devices according to one embodiment.

FIG. 3 illustrates a block diagram of a system 300 including a memory 310 for scalable interrupt virtualization for input/output devices 360 according to one embodiment. In this example, system 300 includes the interrupt manager 180 of the IOMMU 150 of processing device 100 of FIG. 1. In this example, the I/O device 360 (which may be the same as I/O device 160 of FIG. 1 and the I/O device 260 of FIG. 2) includes an AI 365 (which may be the same as AIs 175 of FIG. 1 and the AI 275 of FIG. 2) for a hosting function of the device 360. The AI 365 can be directly assigned to VM 140. For example, the AI 365 may be mapped to one or more pages (e.g., 4 KB) of memory mapped I/O (MMIO) registers. The MMIO registers are used by the VM 140 to directly read or write data from or to the I/O device 360 without any virtual machine monitor (VMM) involvement.

In some embodiments, the I/O device 360 may generate interrupts on behalf of the AI 365 to be delivered to the VM 140, for example, via IOMMU 150. In one embodiment, the I/O device 360 is programmed to send an interrupt message 330. In some embodiments, the I/O device 360 sets a flag 336 in the TLP header to a value that distinguishes the interrupt messages 330 from a DMA request. In that regard, the interrupt manager 180 may determine whether the flag 336 is set to values that indicate the interrupt message 330 is to be re-mapped to an interrupt for the VM 140. The interrupt message 330 may be a data structure (such as an array) that comprises a number of bits comprising a ASID and a handle. In this example, the guest OS of the VM 140 doesn't allocate and manage the handle space. Instead, the handle is allocated and managed by a Scalable IOV guest driver of the I/O device 360, making the handle guest driver specific.

In this example, the IOMMU 150 implements ASID+Handle index 335 for an IRT. For example, a 20-bit ASID and 7-bit handle are combined into a 27-bit "ASID+Handle" index 335. The index 335 is translated into an IRTE using a multi-level table structure, such as the three-level translation tables 370-390. For example, with a 27-bit ASID+Handle index, the total number of possible entries in the IRT can be $2^{27}$. In this example, the table is implemented as a 3-level table (e.g., tables 370, 380 and 390) so that the system 300 does not have to allocate a single contiguous memory of size $2^{27}$ entries in memory 310. In some implementations, the table can be implemented using any number of levels. In other embodiments, the length of ASID and handle of the index 335 may be different and the number of levels in the multi-level table structure may be different. In some embodiments, the interrupt manager 180 receives the interrupt message 330 comprising the ASID+Handle index 335 and remaps the untrusted handle of this index 335 into a trusted interrupt, such as interrupt 395, setup by VMM 130.

In addition to the three-level translation tables 370-390, the system 300 may include a device table 325 in memory 310. The device table 325 maps the I/O device 360 to a context table 350 using a device identifier. For example, the handle may be guest driver specific. As such, the same ASID+Handle index can be from two different guest drivers within the same VM. These two ASID+Handle indexes must remap to two different interrupts into the VM. Hence, each guest driver (or its virtual device) will map a corresponding index to its unique context entry (corresponding to their respective physical devices). Consequently the two guest drivers' ASID+Handle index will use different ASID IRT pointers 355 that are remapped to unique interrupts 395 into the VM.

The device identifier may be defined in a variety of ways, and may be dependent on the peripheral interconnect to which the device is attached. For example, Peripheral Component Interconnect (PCI) devices may form a device ID also referred to as a Requester-ID from the bus number, device number and function number (BDF) 332. For example, the Requester-ID (BDF) 332 may be represented as a 16-bit BDF number, including an 8-bit bus number, a 5-bit device number, and a 3-bit function number. The BDF 332 prohibits a device from using an IOMMU IRTE allocated to another device. For example, when the VMM 130 allocates an IRTE for I/O device 360, it also programs the BDF of the device in the table 325. The interrupt manager 180 of the IOMMU 150 matches the BDF 332 of device 360 sent in the interrupt message 330 with the BDF in an entry of the table 325 and if the match fails or the entry is not found, the interrupt 395 is blocked.

In some embodiments, the device table 325 and context table 350 may include a number of entries. The interrupt manager 180 may index the tables using the BDF 332 to identify a ASID IRT pointer 355 to an IRT table 370. For example, the interrupt manager 180 may traverse or "walk" the tables from entry (e.g., context table pointer 327) to entry (e.g., ASID IRT pointer 355) to identify the IRT table 370. For example, a two level context table 350 is used to map a 16-bit BDF to a ASID IRT pointer 355. Here, the first level (Table 325) uses 9 high bits of the BDF332 for indexing and second level (Context Table 350) uses the remaining 7 bits of the BDF 332 for indexing. The interrupt manager 180 indexes the multi-level table structures 370-390 using the ASID and Handle of the index 335 to identify the trusted interrupt 395 (e.g., set up by the VMM 130) to provide to the VM 140. For example, the interrupt manager 180 may traverse or "walk" the tables from entry 375 to entry 385 to identify the interrupt 395. In this regard, each entry (375, 385) may include a pointer to a base address of respective tables 380 and 390. Once the interrupt is identified, the interrupt manager 180 then transmits the "trusted" interrupt 395 to the VM 140 in accordance with the interrupt message 330.

Figure 4:
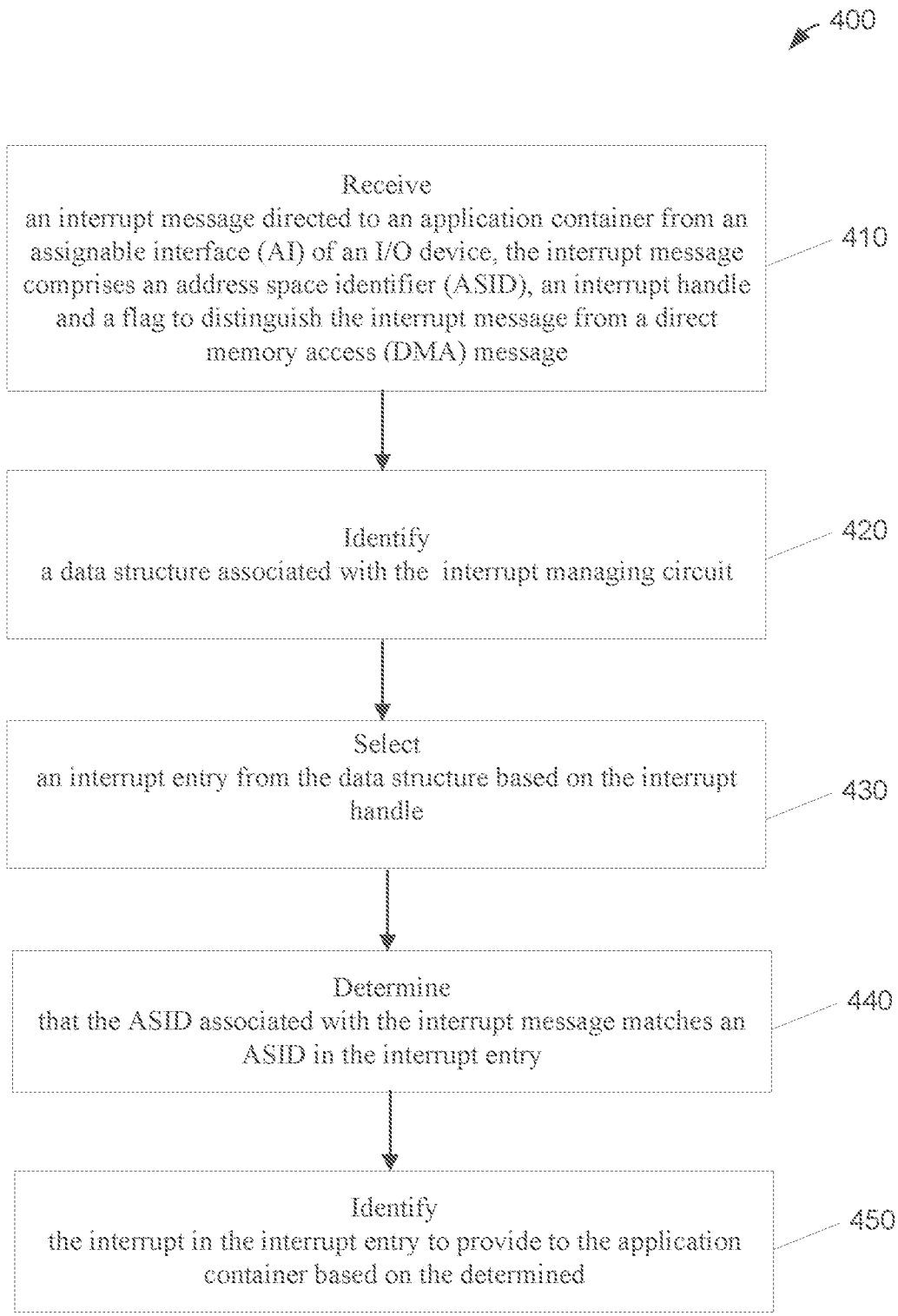
FIG. 4 illustrates a flow diagram of a method for virtualization of interrupts for input/output devices using ASID based filtering according to another embodiment.

FIG. 4 illustrates a flow diagram of a method 400 for virtualization of interrupts for input/output devices using ASID based filtering according to one embodiment. Method 400 may be performed by processing logic (such as the ASID based filtering logic 185 of FIG. 1) that may comprise hardware (e.g., circuitry, dedicated logic, programmable logic, microcode, etc.), software (such as instructions run on a processing device), firmware, or a combination thereof. In one embodiment, an interrupt managing circuit (e.g., interrupt manager 180) of the processing device 100 in FIG. 1 may perform method 400. Although shown in a particular sequence or order, unless otherwise specified, the order of the processes can be modified. Thus, the illustrated embodiments should be understood only as examples, and the illustrated processes can be performed in a different order, and some processes may be performed in parallel. Additionally, one or more processes can be omitted in various embodiments. Thus, not all processes are required in every embodiment. Other process flows are possible.

Referring to FIG. 4, method 400 receives in block 410 an interrupt message 190 directed to an application container (e.g., a virtual machine (VM) 140, 141) from an assignable interface (AI) 175 of an I/O device 160. The interrupt message 190 comprises an address space identifier (ASID) 192, an interrupt handle 194 and a flag 196 to distinguish the interrupt message 190 from a direct memory access (DMA) message. For example, the interrupt message 190 may be based on a work request sent from the application container to an assignable interface (AI) 175 of an I/O device 160. The work request may include the interrupt handle message 190 that is unique across the computer system (e.g., the interrupt handle is allocated and managed by the VMM 130) and is to be used for sending an interrupt to the application container (e.g., VM 140, 141).

Responsive to receiving the interrupt message 190, a data structure 186 (e.g., IRT 186) associated with the processing device 100 is identified in block 420. In block 430, an interrupt entry (e.g., IRTE 184) is selected from the data structure 186 based on the interrupt handle 194. In block 440, it is determined that that the ASID 192 associated with the interrupt message 190 matches an ASID 182 in the interrupt entry 184. Thereupon, an interrupt, such as interrupt 285) in the interrupt entry 184 is forwarded to the VM 140,141 in block 440. In that regard, the interrupt 285 in the interrupt entry 184 may be identified based on the determination made in block 440.

Figure 5A:
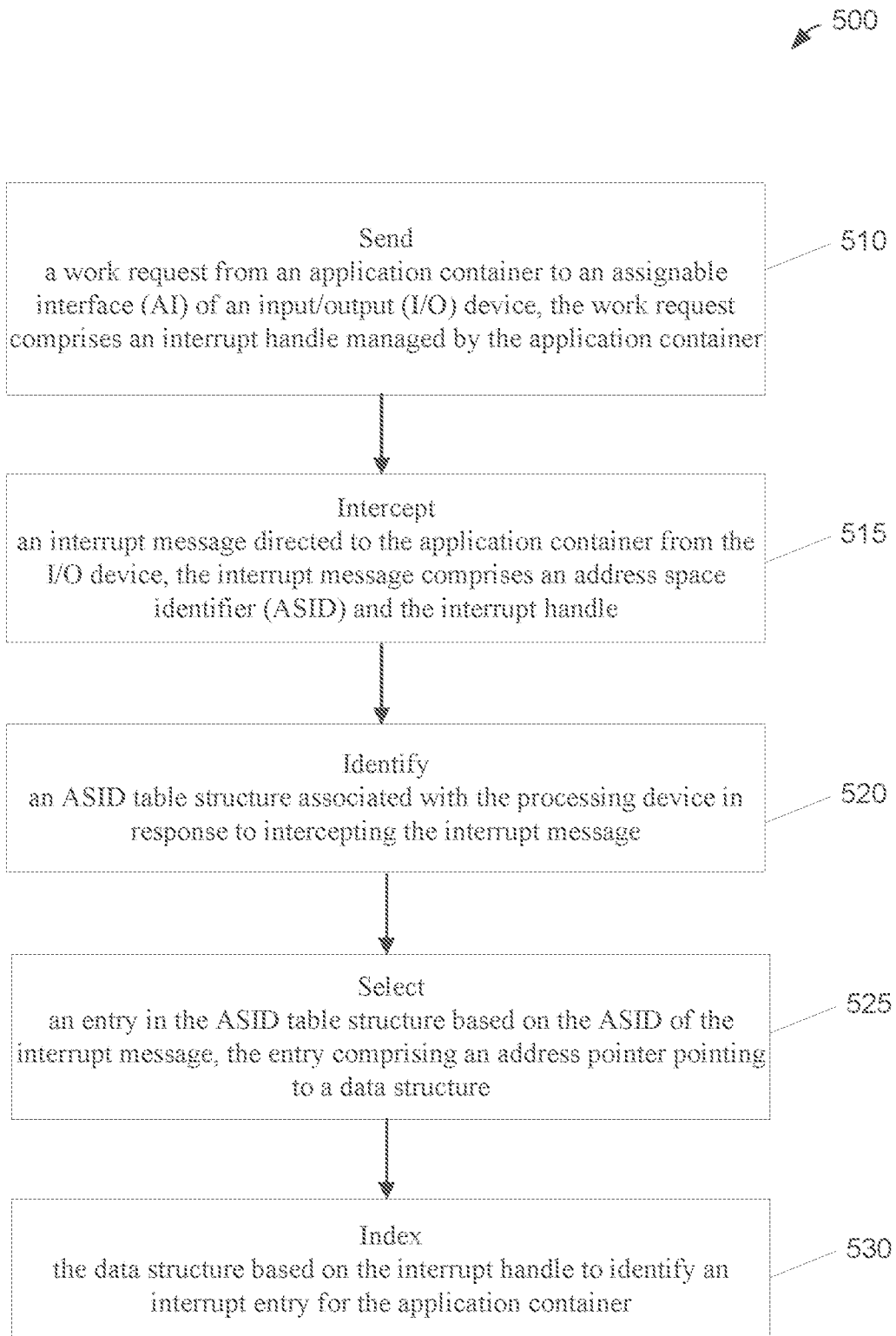
FIG. 5A illustrates a flow diagram of a method for virtualization of interrupts for input/output devices according to one embodiment.

FIG. 5A illustrates a flow diagram of a method 500 for virtualization of interrupts for scalable virtualization of input/output devices according to one embodiment. Method 500 may be performed by processing logic that may comprise hardware (e.g., circuitry, dedicated logic, programmable logic, microcode, etc.), software (such as instructions run on a processing device), firmware, or a combination thereof. In one embodiment, an interrupt managing circuit (e.g., interrupt manager 180) of the processing device 100 in FIG. 1 may perform method 500. Although shown in a particular sequence or order, unless otherwise specified, the order of the processes can be modified. Thus, the illustrated embodiments should be understood only as examples, and the illustrated processes can be performed in a different order, and some processes may be performed in parallel. Additionally, one or more processes can be omitted in various embodiments. Thus, not all processes are required in every embodiment. Other process flows are possible.

Referring to FIG. 5A, method 500 sends a work request from an application container (e.g., VM 140) to an assignable interface (AI) 275 of an input/output (I/O) device 260 in block 510. The work request comprises an interrupt handle 230 managed by the application container. In block 515, an interrupt message 230 directed to the application container 140 from the I/O device 260 is intercepted. The interrupt message comprises an address space identifier (ASID) 232 and the interrupt handle 234. Responsive to intercepting the interrupt message, an ASID table structure 250 associated with the processing device is identified in block 520. In block 525, an entry 252 in the ASID table structure is selected based on the ASID 232 of the interrupt message 230. The entry 252 comprising an address pointer 255 pointing to a data structure (e.g., IRT 280). In 530, the data structure (IRT 280) is indexed based on the interrupt handle 234 to identify an interrupt entry 285 for the application container 140.

Figure 5B:
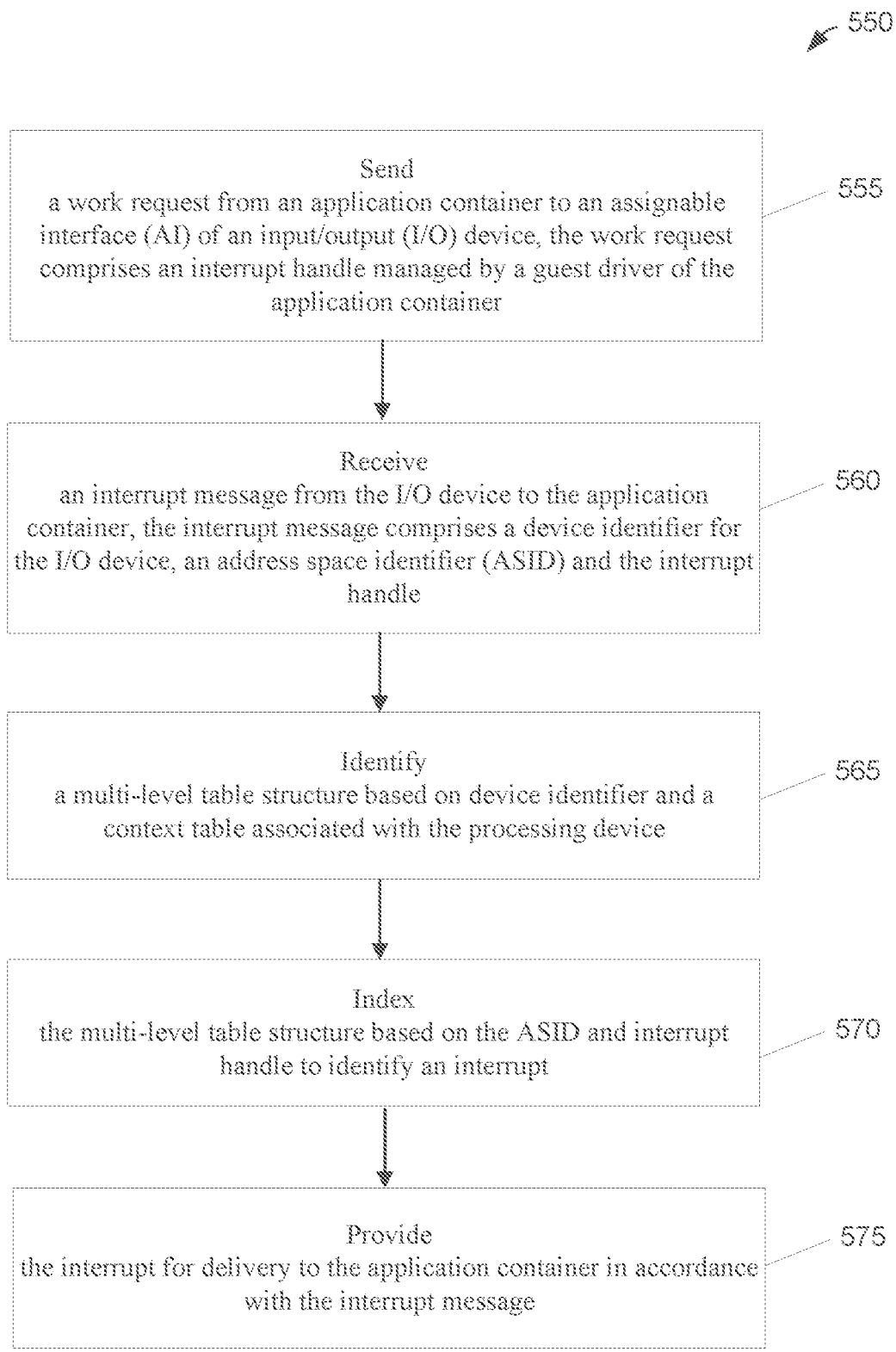
FIG. 5B illustrates a flow diagram of a method for virtualization of interrupts for input/output devices according to another embodiment.

FIG. 5B illustrates a flow diagram of a method 550 for virtualization of interrupts for input/output devices using shared work queues according to one embodiment. Method 550 may be performed by processing logic that may comprise hardware (e.g., circuitry, dedicated logic, programmable logic, microcode, etc.), software (such as instructions run on a processing device), firmware, or a combination thereof. In one embodiment, an interrupt managing circuit (e.g., interrupt manager 180) of the processing device 100 in FIG. 1 may perform method 550. Although shown in a particular sequence or order, unless otherwise specified, the order of the processes can be modified. Thus, the illustrated embodiments should be understood only as examples, and the illustrated processes can be performed in a different order, and some processes may be performed in parallel. Additionally, one or more processes can be omitted in various embodiments. Thus, not all processes are required in every embodiment. Other process flows are possible.

Referring to FIG. 5B, method 550 sends a work request from an application container (e.g., VM 140) to an assignable interface (AI) 365 of an input/output (I/O) device 360 in block 555. The work request comprises an interrupt handle managed by a guest driver 145 of the application container 140. In block 560, an interrupt message 330 from the I/O device 360 to the application container 140 is received. The interrupt message 330 comprises a device identifier (e.g., BDF 332) for the I/O device 360, an address space identifier (ASID) and the interrupt handle 335. Responsive to receiving the interrupt message 330, a multi-level table structure (370-390) is identified in block 565 based on the device identifier 332 for the I/O device 360 and a context table 355 associated with the processing device. In block 570, the multi-level table structure (370-390) is indexed based on the ASID and interrupt handle 335 to identify an interrupt 395. Thereupon, the interrupt 395 is provided in block 575 for delivery to the application container 140 in accordance with the interrupt message 330.

Figures 6A, 6B:
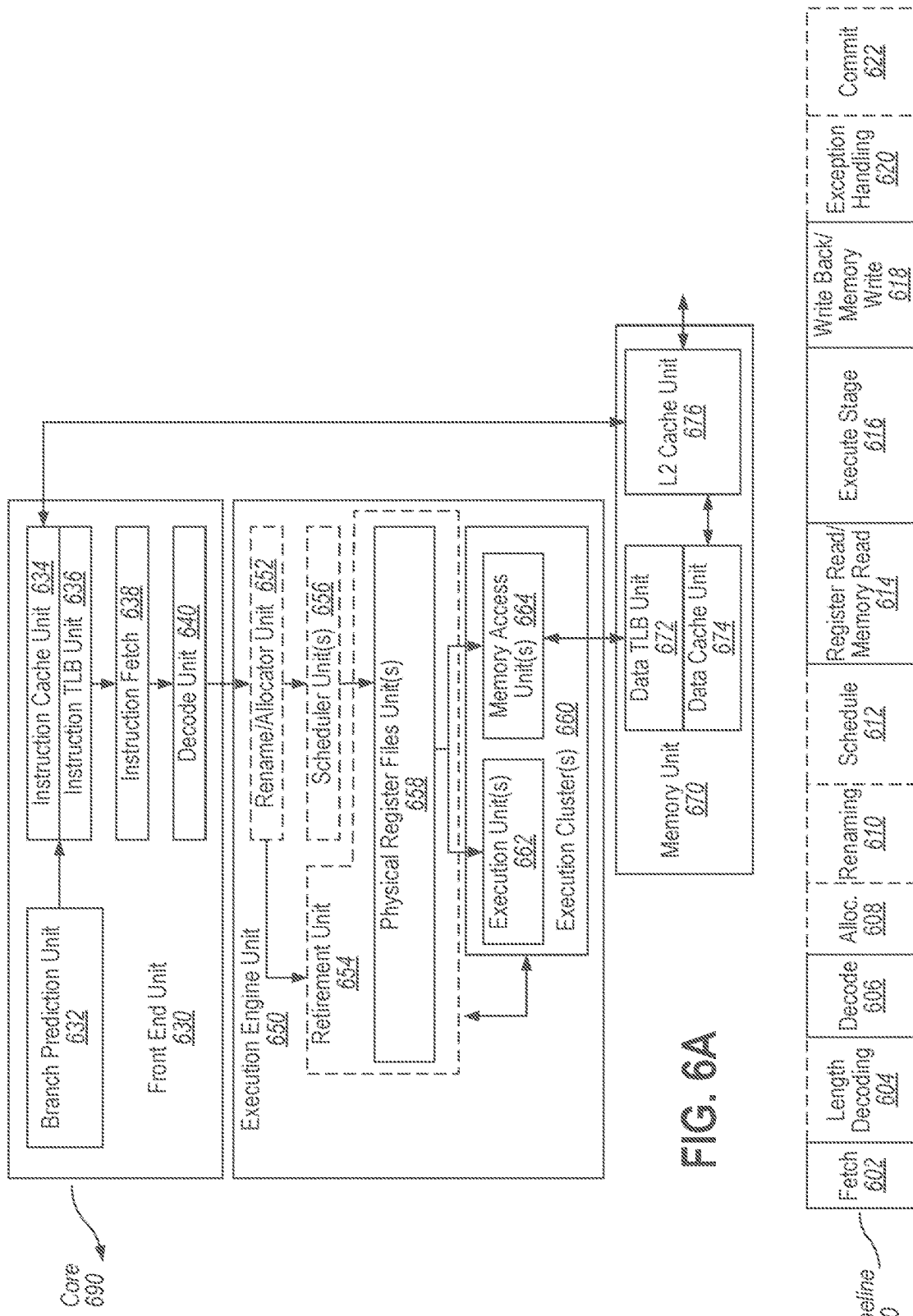
FIG. 6A is a block diagram illustrating a micro-architecture for a processor according to an embodiment of the disclosure.
FIG. 6B is a block diagram illustrating an in-order pipeline and a register renaming stage, out-of-order issue/execution pipeline according to an embodiment of the disclosure.

FIG. 6A is a block diagram illustrating a micro-architecture for a processor 600 that implements techniques for scalable interrupt virtualization for input/output devices in accordance with one embodiment of the disclosure. Specifically, processor 600 depicts an in-order architecture core and a register renaming logic, out-of-order issue/execution logic to be included in a processor according to at least one embodiment of the disclosure.

Processor 600 includes a front-end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware embodiments, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one embodiment, processor 600 may be the same as processing device 100 described with respect to FIG. 1 for scalable interrupt virtualization for input/output devices as described with respect to embodiments of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming is used in the in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
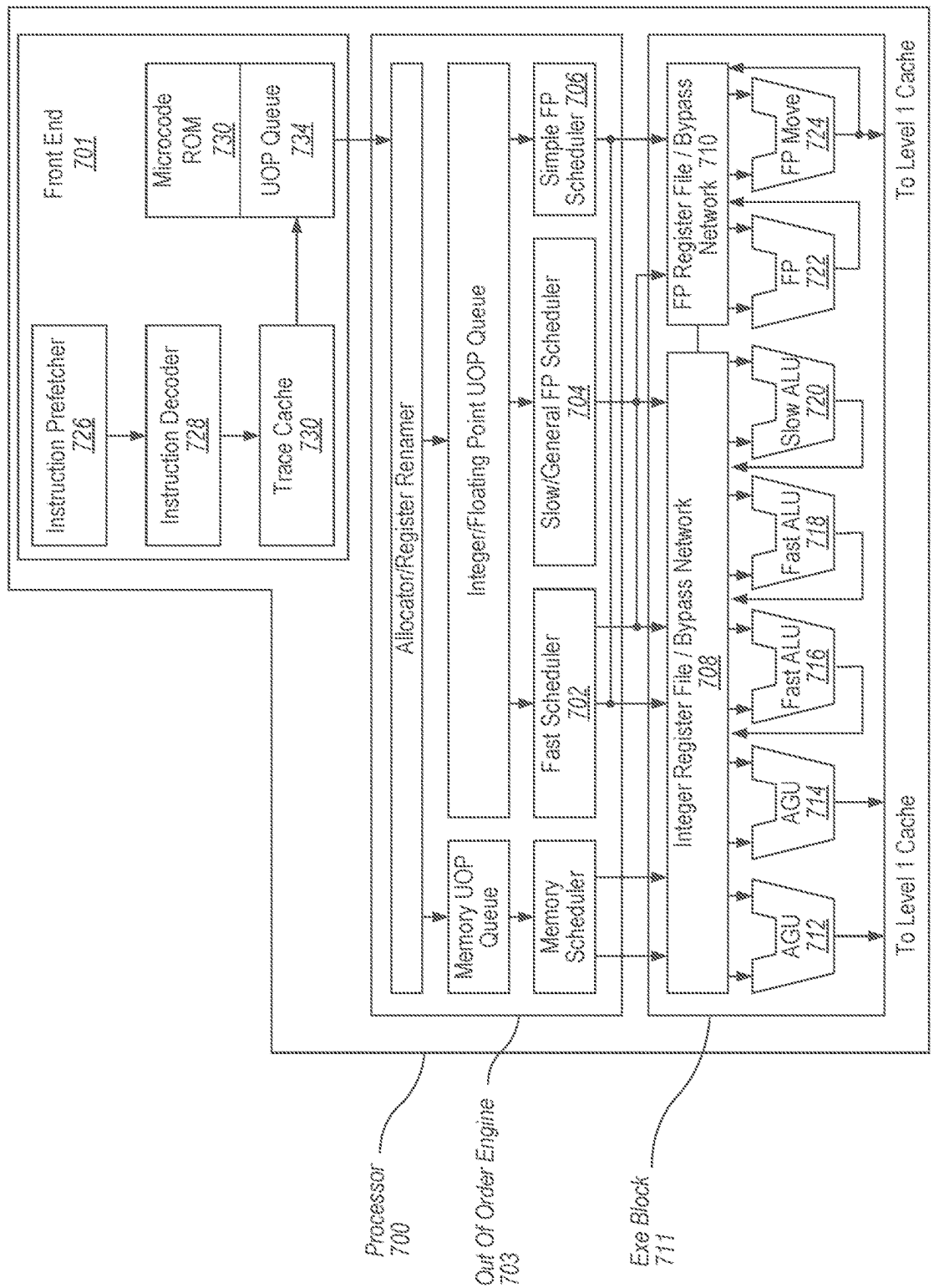
FIG. 7 is a block diagram illustrating a micro-architecture for a processor in accordance with one embodiment of the disclosure.

FIG. 7 illustrates a block diagram of the micro-architecture for a processor 700 that includes logic circuits to implement techniques for virtualization of process address space identifiers for scalable interrupt virtualization for input/output devices in accordance with one embodiment of the disclosure. In some embodiments, an instruction in accordance with one embodiment can be implemented to operate on data elements having sizes of byte, word, double-word, quadword, etc., as well as data types, such as single and double precision integer and floating point data types. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728, which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct microinstruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710 sit between the schedulers 702, 704, 706, and the execution units 712, 714, 716, 718, 720, 722, 724 in the execution block 711. There is a separate register file 708, 710, for integer and floating-point operations, respectively. Each register file 708, 710, of one embodiment also includes a bypass network that can bypass or forward just completed results that have not yet been written into the register file to new dependent uops. The integer register file 708 and the floating-point register file 710 are also capable of communicating data with the other. For one embodiment, the integer register file 708 is split into two separate register files, one register file for the low order 32 bits of data and a second register file for the high order 32 bits of data. The floating-point register file 710 of one embodiment has 128 bit wide entries because floating-point instructions typically have operands from 64 to 128 bits in width.

The execution block 711 contains the execution units 712, 714, 716, 718, 720, 722, 724, where the instructions are actually executed. This section includes the register files 708, 710 that store the integer and floating point data operand values that the microinstructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating-point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the disclosure, instructions involving a floating-point value may be handled with the floating-point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. The AGUs 712, 714 may execute memory load/store operations. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating-point units 722, 724, can be implemented to support a range of operands having bits of various widths. For one embodiment, the floating-point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement store address prediction for memory disambiguation according to embodiments of the disclosure. In one embodiment, the execution block 711 of processor 700 may include a store address predictor (not shown) for implementing techniques for scalable interrupt virtualization for input/output devices in accordance with one embodiment of the disclosure.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. In one embodiment, a register file also includes eight (8) multimedia SIMD register(s) for the packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
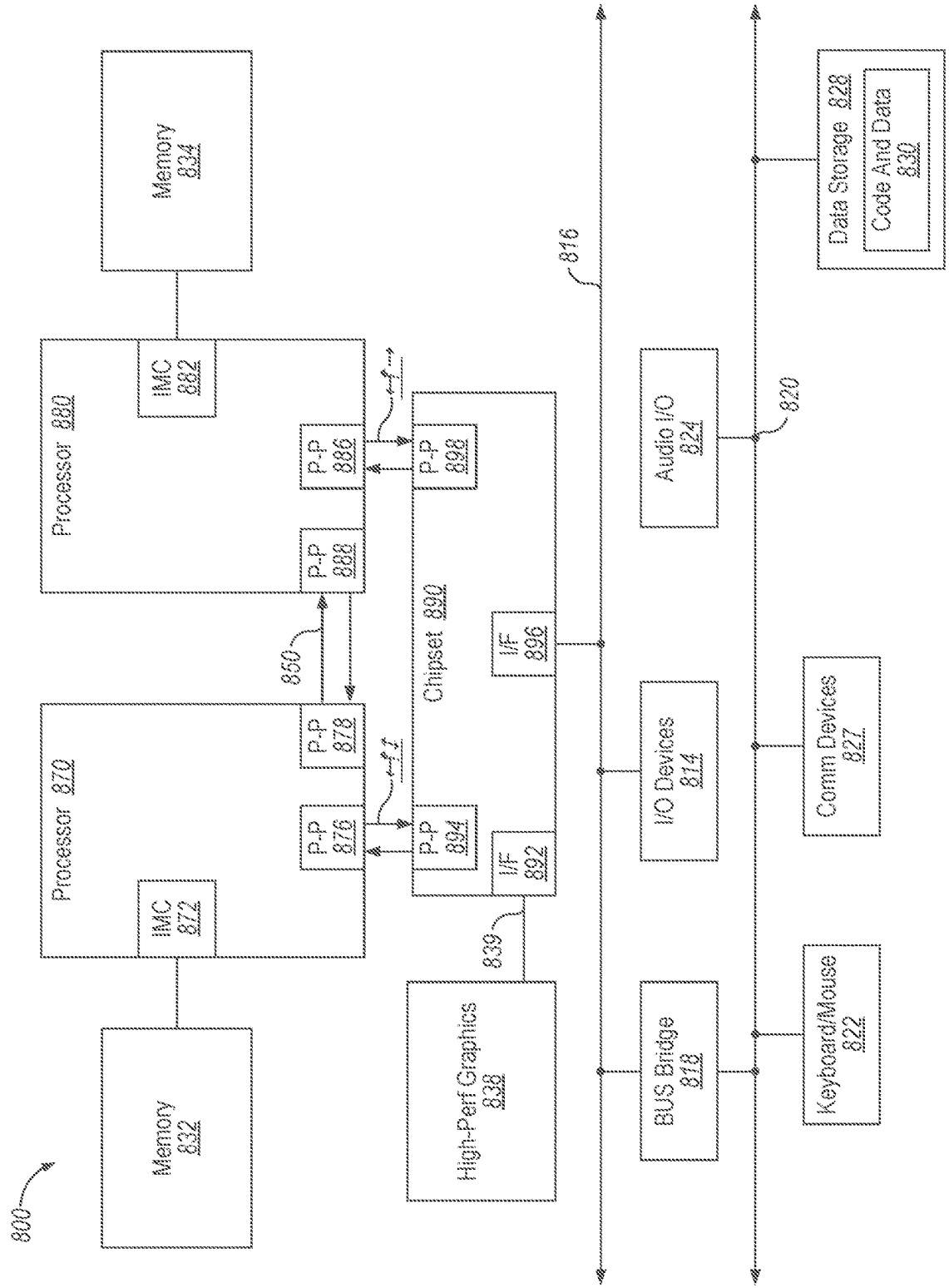
FIG. 8 is a block diagram illustrating a system in which an embodiment of the disclosure may be used.

Embodiments may be implemented in many different system types. Referring now to FIG. 8, shown is a block diagram illustrating a system 800 in which an embodiment of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may implement techniques for scalable interrupt virtualization for input/output devices as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point-to-point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
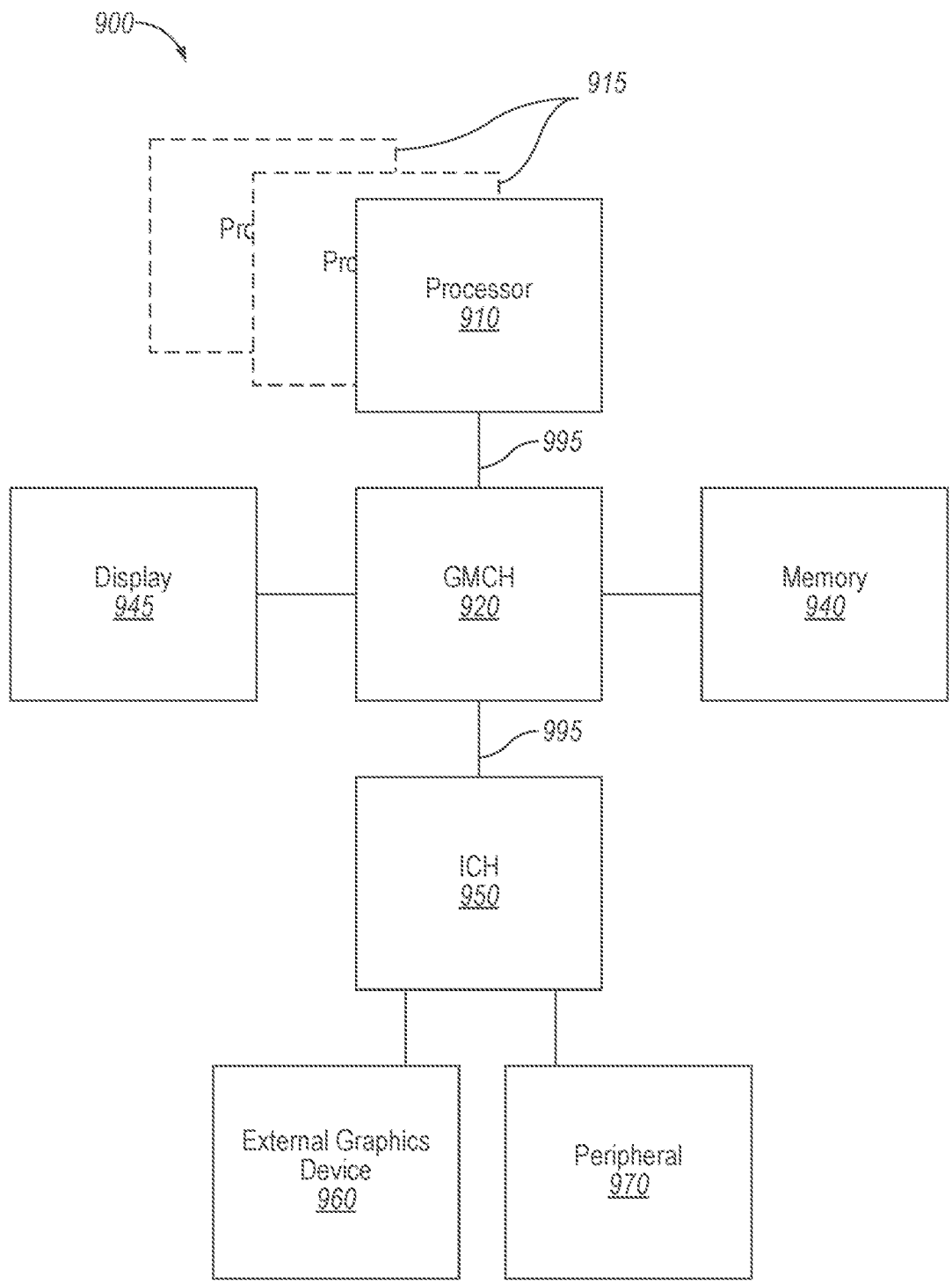
FIG. 9 is a block diagram illustrating a system in which an embodiment of the disclosure may operate.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 provide for scalable interrupt virtualization for input/output devices according to embodiments of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a front side bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the embodiment of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
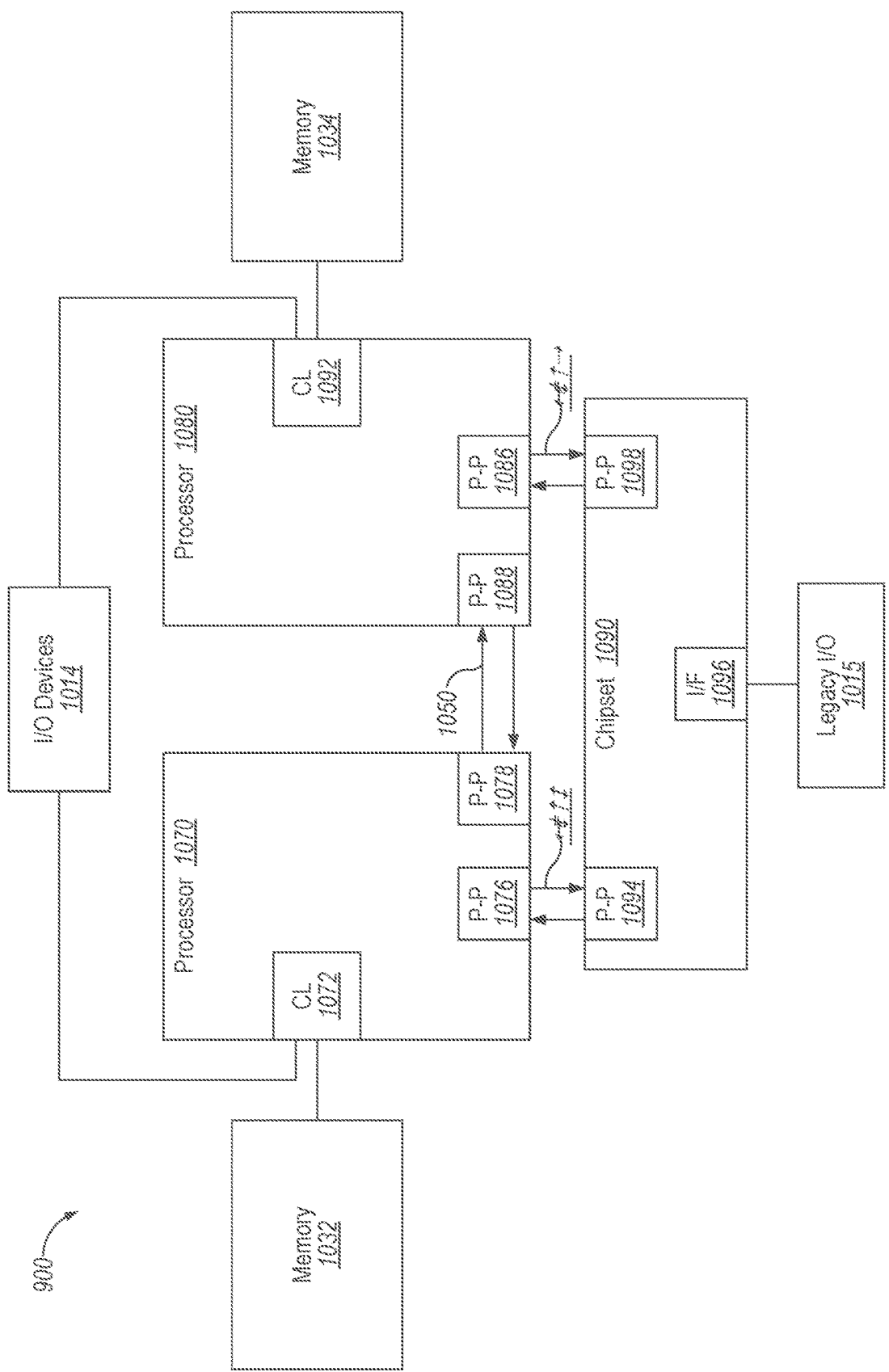
FIG. 10 is a block diagram illustrating a system in which an embodiment of the disclosure may operate.

Referring now to FIG. 10, shown is a block diagram of a system 1000 in which an embodiment of the disclosure may operate. FIG. 10 illustrates processors 1070, 1080. In one embodiment, processors 1070, 1080 may provide for scalable interrupt virtualization for input/output devices as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096. The embodiments of the processing device 100 of FIG. 1 may be implemented in processor 1070, processor 1080, or both.

Figure 11:
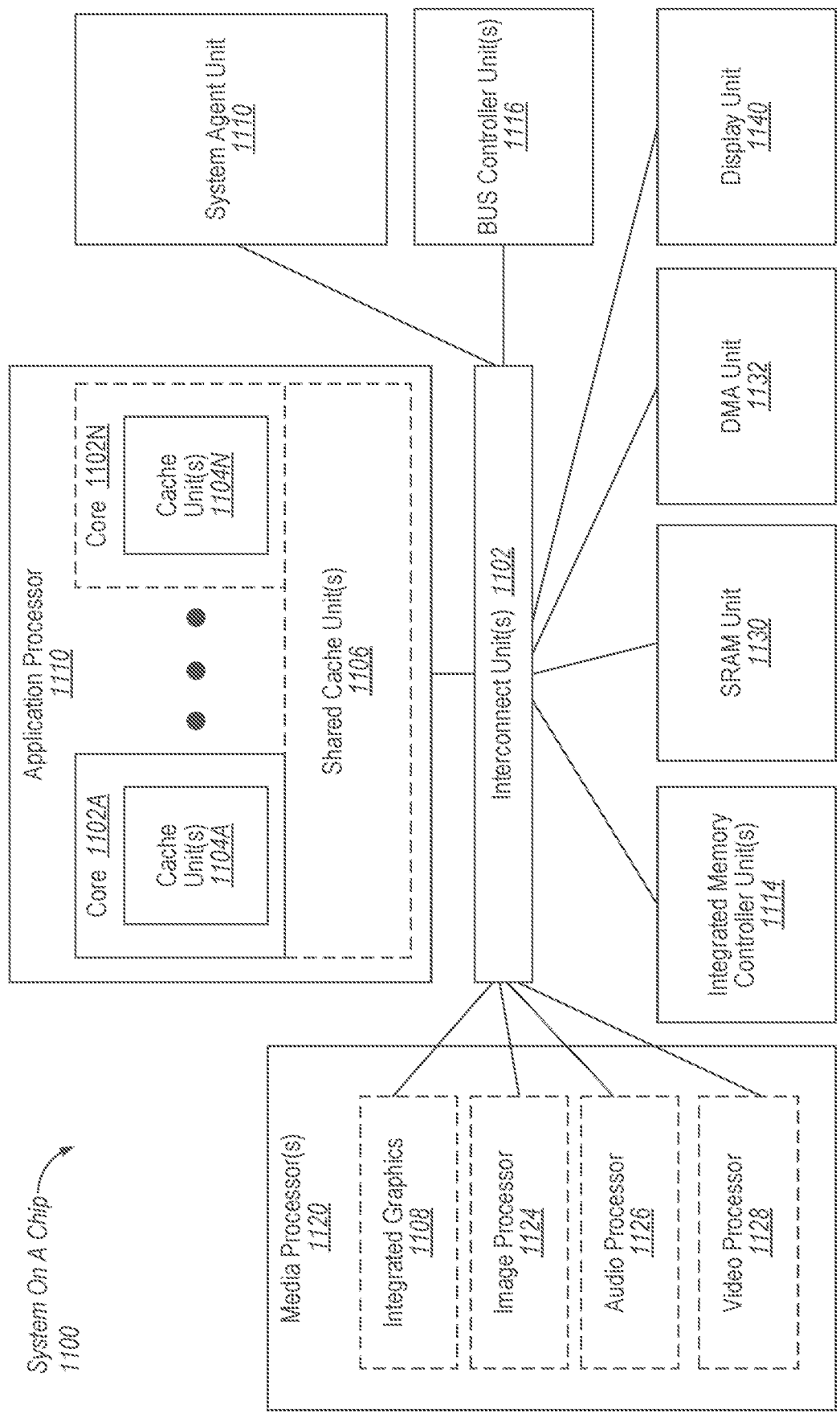
FIG. 11 is a block diagram illustrating a System-on-a-Chip (SoC) according to an embodiment of the disclosure.

Embodiments may be implemented in many different system types. FIG. 11 is a block diagram of a SoC 1100 in accordance with an embodiment of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set of one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The application processor 1120 may include a PMU for implementing silent memory instructions and miss-rate tracking to optimize switching policy on threads as described in embodiments herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
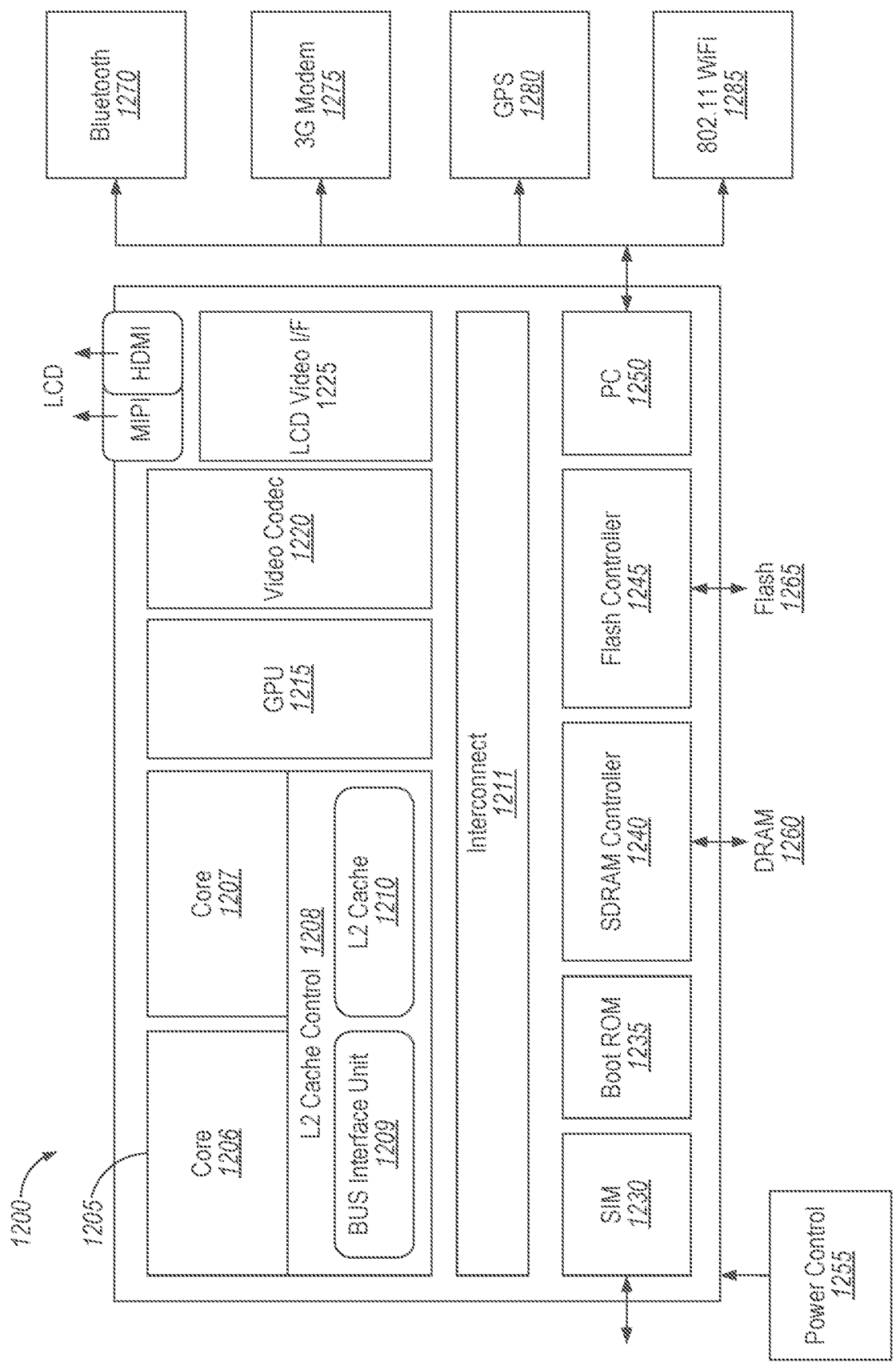
FIG. 12 is a block diagram illustrating a SoC design according to an embodiment of the disclosure.

FIG. 12 is a block diagram of an embodiment of a system on-chip (SoC) design in accordance with the disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one embodiment, cores 1206, 1207 may provide for scalable interrupt virtualization for input/output devices as described in embodiments herein.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1247 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
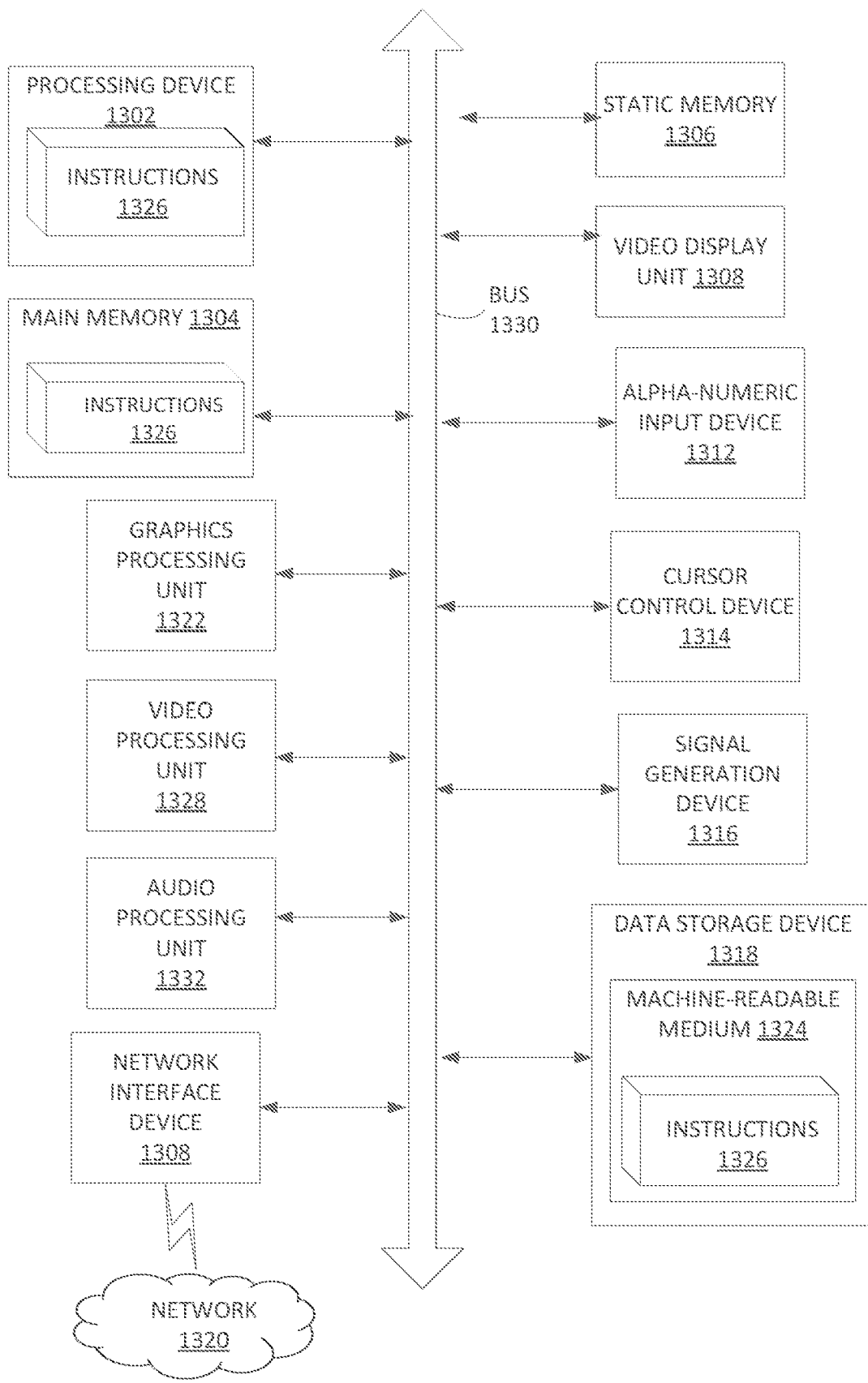
FIG. 13 illustrates a block diagram illustrating a computer system according to an embodiment of the disclosure.

FIG. 13 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or more processing cores. The processing device 1302 is configured to execute the processing logic 1326 for performing the operations and steps discussed herein. In one embodiment, processing device 1302 is the same as processing device 100 described with respect to FIG. 1 that implement techniques for scalable interrupt virtualization for input/output devices as described herein with embodiments of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics-processing unit 1322, a video processing unit 1328, and an audio processing unit 1332.

The data storage device 1318 may include a machine-accessible storage medium 1324 on which is stored software 1326 implementing any one or more of the methodologies of functions described herein, such as implementing silent memory instructions and miss-rate tracking to optimize switching policy on threads in a processing device as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media. In some embodiments, data storage device 1318 may include a non-transitory computer-readable storage medium, such as computer-readable storage medium 1324, on which may store instructions 1326 encoding any one or more of the methods or functions described herein, including instructions encoding the techniques including the translation controller 180 of FIG. 1 for implementing method 400 of FIG. 4, method 500 of FIG. 5A or method 550 of FIG. 5B.

The machine-readable storage medium 1324 may also be used to store instructions 1326 implementing silent memory instructions and miss-rate tracking to optimize switching policy on threads in a processing device such as described with respect to processing device 100 in FIG. 1, and/or a software library containing methods that call the above applications. While the machine-accessible storage medium 1328 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 includes a processing device comprising: an interrupt managing circuit to: receive an interrupt message directed to an application container from an assignable interface (AI) of an input/output (I/O) device, the interrupt message comprises an address space identifier (ASID), an interrupt handle and a flag to distinguish the interrupt message from a direct memory access (DMA) message; responsive to receiving the interrupt message, identify a data structure associated with the processing device; select an interrupt entry from the data structure based on the interrupt handle; determine that the ASID associated with the interrupt message matches an ASID in the interrupt entry; and identify an interrupt in the interrupt entry to provide to the application container based on the determined.

Example 2 includes the processing device of example 1, wherein the processing device is further to forward the interrupt to the application container.

Example 3 includes the processing device of example 1, wherein the interrupt handle is allocated to the AI of the I/O device by a virtual machine monitor associated with the application container and the interrupt message is associated with interrupt message storage (IMS) of the I/O device.

Example 4 includes the processing device of example 1, wherein to identify the data structure, the interrupt managing circuit is further to: select an entry in an ASID table based on the ASID associated with the interrupt message; and identifying, in the entry, an address pointer pointing to an interrupt remapping table (IRT) comprising a plurality of interrupt remapping table entries (IRTE), each IRTE is extended to include an ASID field.

Example 5 includes the processing device of example 4, further comprising a register comprising a pointer to the ASID table.

Example 6 include the processing device of example 4, wherein the interrupt managing circuit is further to, responsive to detecting that the ASID of the interrupt message is different from an ASID of an IRTE, block the interrupt from being forwarded to the application container.

Example 7 includes the processing device of example 1, wherein the interrupt message is included in an I/O command associated with the I/O device.

Example 8 includes a method comprising: sending, by a processing device, a work request from an application container to an assignable interface (AI) of an input/output (I/O) device, the work request comprises an interrupt handle managed by the application container; intercepting, by the processing device, an interrupt message directed to the application container from the I/O device, the interrupt message comprises an address space identifier (ASID) and the interrupt handle; responsive to intercepting the interrupt message, identifying an ASID table structure associated with the processing device; selecting, by the processing device, an entry in the ASID table structure based on the ASID of the interrupt message, the entry comprising an address pointer pointing to a data structure; indexing, by the processing device, the data structure based on the interrupt handle to identify an interrupt entry for the application container.

Example 9 includes the method of example 8, further comprising providing the interrupt in the interrupt entry to the application container in accordance with the interrupt message.

Example 10 includes the method of example 8, further comprising identifying a flag in the interrupt message to distinguish the interrupt message from a direct memory access (DMA) message.

Example 11 includes the method of example 8, wherein the interrupt message is included in an I/O command associated with the I/O device.

Example 12 includes the method of example 8, wherein to identify the ASID table structure, the processing device is further to read a register comprising a pointer to the ASID table structure.

Example 13 includes the method of example 8, wherein the interrupt handle is allocated to the I/O device by the application container.

Example 14 includes the method of example 8, wherein the interrupt message is associated with interrupt message storage (IMS) of the I/O device.

Example 15 includes a system comprising: a memory to store a plurality of interrupt messages; and a processing device, operatively coupled to the memory, to: receive an interrupt message directed to an application container from an assignable interface (AI) of an input/output (I/O) device, the interrupt message comprises an address space identifier (ASID), an interrupt handle and a flag to distinguish the interrupt message from a direct memory access (DMA) message; responsive to receiving the interrupt message, identify a data structure associated with the interrupt managing circuit; select an interrupt entry from the data structure based on the interrupt handle; determine that the ASID associated with the interrupt message matches an ASID in the interrupt entry; and forward an interrupt in the interrupt entry to the application container.

Example 16 includes the system of example 15, wherein the interrupt handle is allocated to the AI of the I/O device by a virtual machine monitor associated with the application container.

Example 17 includes the system of example 15, wherein the interrupt message is associated with interrupt message storage (IMS) of the I/O device.

Example 18 includes the system of example 15, wherein to identify the data structure, the processing device is further to: select an entry in an ASID table based on the ASID associated with the interrupt message; and identifying, in the entry, an address pointer pointing to an interrupt remapping table (IRT) comprising a plurality of interrupt remapping table entries (IRTE), each IRTE is extended to include an ASID field.

Example 19 includes the system of example 18, further comprising a register comprising a pointer to the ASID table.

Example 20 includes the system of example 18, wherein the processing device is further to, responsive to detecting that the ASID of the interrupt message is different from an ASID of an IRTE, block the interrupt from being forwarded to the application container.

Example 21 includes the system of example 15, wherein the interrupt message is included in an I/O command associated with the I/O device.

Example 22 includes a non-transitory computer-readable medium comprising instructions that, when executed by a processing device, cause the processing device to: send, by the processing device, a work request from an application container to an assignable interface (AI) of an input/output (I/O) device, the work request comprises an interrupt handle managed by a guest driver of the application container; receive an interrupt message from the I/O device to the application container, the interrupt message comprises a device identifier for the I/O device, an address space identifier (ASID) and the interrupt handle; responsive to receiving the interrupt message, identify a multi-level table structure based on the device identifier and a context table associated with the processing device; index the multi-level table structure based on the ASID and interrupt handle to identify an interrupt; and provide the interrupt for delivery to the application container in accordance with the interrupt message.

Example 23 includes the non-transitory computer-readable medium of example 22, wherein the interrupt message is associated with interrupt message storage (IMS) of the I/O device.

Example 24 includes the non-transitory computer-readable medium of example 22, wherein the interrupt handle is allocated to the AI of the I/O device by the guest driver associated with the application container.

Example 25 includes the non-transitory computer-readable medium of example 22, wherein the processing device is further to identify a flag in the interrupt message to distinguish the interrupt message from a direct memory access (DMA) message.

Example 26 includes the non-transitory computer-readable medium of example 22, wherein the interrupt message is included in an I/O command associated with the I/O device.

Example 27 includes the non-transitory computer-readable of example of example 22, wherein the processing device is further to combine the ASID and interrupt handle into an index identifier for indexing the multi-level table structure.

Example 28 includes a non-transitory, computer-readable storage medium including instructions that, when executed by a processor, cause the processor to perform the method of examples 8-14.

Example 29 includes an apparatus comprising: a plurality of functional units of a processor; means for receiving an interrupt message directed to an application container from an assignable interface (AI) of an input/output (I/O) device, the interrupt message comprises an address space identifier (ASID), an interrupt handle and a flag to distinguish the interrupt message from a direct memory access (DMA) message; means for, responsive to receiving the interrupt message, identifying a data structure associated with the interrupt managing circuit; means of selecting an interrupt entry from the data structure based on the interrupt handle; means for determining that the ASID associated with the interrupt message matches an ASID in the interrupt entry; and means for forwarding an interrupt in the interrupt entry to the application container.

Example 30 includes the apparatus of example 29, further comprising the subject matter of any of examples 1-7 and 15-21.

Example 31 includes a system comprising: a memory device and a processor comprising a memory controller unit, wherein the processor is configured to perform the method of any of examples 8-14.

Example 32 includes the system of example 31, further comprising the subject matter of any of examples 1-7 and 15-21.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of to, 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, the values or portions of values may represent states. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device comprising:
 a processor core to implement a virtual machine monitor for a plurality of virtual machines; and
 an interrupt managing circuit, coupled to the processor core, to:
  receive an interrupt message directed to a virtual machine from an assignable interface (AI) of an input/output (I/O) device, the interrupt message comprising an identifier to identify the virtual machine to which the AI is assigned, an interrupt handle, and a flag to distinguish the interrupt message from a direct memory access (DMA) message and indicate the interrupt message is to be re-mapped to an interrupt for the virtual machine, responsive to receiving the interrupt message, identify a data structure associated with the processing device, select an interrupt entry from the data structure based on the interrupt handle, determine that the identifier of the interrupt message matches an identifier in the interrupt entry, and identify the interrupt in the interrupt entry to provide to the virtual machine based on the determination that the identifier of the interrupt message matches the identifier in the interrupt entry.

2. The processing device of claim 1, wherein the processing device is further to forward the interrupt to the virtual machine.

3. The processing device of claim 1, wherein the interrupt handle is allocated to the AI of the I/O device by the virtual machine monitor associated with the virtual machine and the interrupt message is associated with interrupt message storage (IMS) of the I/O device.

4. The processing device of claim 1, wherein to identify the data structure, the interrupt managing circuit is further to:

select an entry in an identifier table based on the identifier of the interrupt message; and identify, in the entry, an address pointer pointing to an interrupt remapping table (IRT) comprising a plurality of interrupt remapping table entries (IRTE), each IRTE extended to include an identifier field.

5. The processing device of claim 4, further comprising a register comprising a pointer to the identifier table.

6. The processing device of claim 4, wherein the interrupt managing circuit is further to, responsive to detection that the identifier of the interrupt message is different from an identifier of an IRTE, block the interrupt from being forwarded to the virtual machine.

7. The processing device of claim 1, wherein the interrupt message is included in an I/O command associated with the I/O device.

8. A method comprising:

sending, by a processing device, a work request from a virtual machine to an assignable interface (AI) of an input/output (I/O) device, the work request comprising an interrupt handle managed by the virtual machine;

intercepting, by the processing device, an interrupt message directed to the virtual machine from the I/O device, the interrupt message comprising an identifier to identify the virtual machine to which the AI is assigned, the interrupt handle, and a flag to indicate the interrupt message is to be re-mapped to an interrupt for the virtual machine;

responsive to intercepting the interrupt message, identifying an identifier table structure associated with the processing device;

selecting, by the processing device, an entry in the identifier table structure based on the identifier of the interrupt message, the entry comprising an address pointer pointing to a data structure; and indexing, by the processing device, the data structure based on the interrupt handle to identify an interrupt entry for the virtual machine.

9. The method of claim 8, further comprising providing the interrupt in the interrupt entry to the virtual machine in accordance with the interrupt message.

10. The method of claim 8, further comprising identifying the flag in the interrupt message distinguishes the interrupt message from a direct memory access (DMA) message.

11. The method of claim 8, wherein the interrupt message is included in an I/O command associated with the I/O device.

12. The method of claim 8, wherein to identify the identifier table structure, the processing device is further to read a register comprising a pointer to the identifier table structure.

13. The method of claim 8, wherein the interrupt handle is allocated to the I/O device by the virtual machine.

14. The method of claim 8, wherein the interrupt message is associated with interrupt message storage (IMS) of the I/O device.

15. A non-transitory computer-readable medium comprising instructions that, when executed by a processing device, cause the processing device to:

send, by the processing device, a work request from a virtual machine to an assignable interface (AI) of an input/output (I/O) device, the work request comprising an interrupt handle managed by a guest driver of the virtual machine;

receive an interrupt message from the I/O device to the virtual machine, the interrupt message comprising a device identifier for the I/O device, an identifier to identify the virtual machine to which the AI is assigned, the interrupt handle, and a flag to indicate the interrupt message is to be re-mapped to an interrupt for the virtual machine;

responsive to receiving the interrupt message, identify a multi-level table structure based on the device identifier and a context table associated with the processing device;

index the multi-level table structure based on the identifier and interrupt handle to identify the interrupt; and provide the interrupt for delivery to the virtual machine in accordance with the interrupt message.

16. The non-transitory computer-readable medium of claim 15, wherein the interrupt message is associated with interrupt message storage (IMS) of the I/O device.

17. The non-transitory computer-readable medium of claim 15, wherein the interrupt handle is allocated to the AI of the I/O device by the guest driver associated with the virtual machine.

18. The non-transitory computer-readable medium of claim 15, wherein the processing device is further to identify the flag in the interrupt message distinguishes the interrupt message from a direct memory access (DMA) message.

19. The non-transitory computer-readable medium of claim 15, wherein the interrupt message is included in an I/O command associated with the I/O device.

20. The non-transitory computer-readable medium of claim 15, wherein the processing device is further to combine the identifier and the interrupt handle into an index identifier for indexing the multi-level table structure.

* * * * *